US012795137B2

(12) United States Patent
Dabbadi et al.

(10) Patent No.: US 12,795,137 B2
(45) Date of Patent: Nov. 10, 2026

(54) SYSTEMS AND METHODS OF VIDEO DECODING WITH DYNAMIC NOISE RECONSTRUCTION

(71) Applicant: QUALCOMM Incorporated, San Diego, CA (US)

(72) Inventors: Gopi Madhan Dabbadi, Bangalore (IN); Rosali Patro, Berhampur (IN); Apoorva Nagarajan, Bangalore (IN); Sandeep Nellikatte Srivatsa, Bangalore (IN); Ashish Mishra, Bhubaneswar (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/103,809

(22) PCT Filed: Oct. 24, 2023

(86) PCT No.: PCT/US2023/077654
§ 371 (c)(1),
(2) Date: Feb. 13, 2025

(87) PCT Pub. No.: WO2024/091953
PCT Pub. Date: May 2, 2024

(65) Prior Publication Data

US 2026/0059130 A1 Feb. 26, 2026

(30) Foreign Application Priority Data

Oct. 28, 2022 (IN) ............................. 202241061585

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/182* (2014.11); *H04N 19/186* (2014.11); *H04N 19/70* (2014.11)

(58) Field of Classification Search
None
See application file for complete search history.

(56) References Cited

U.S. PATENT DOCUMENTS 11,765,372 B1 * 9/2023 Waggoner ............ H04N 19/172 375/240.03
2024/0179330 A1 * 5/2024 Mccarthy ............... H04N 19/40

FOREIGN PATENT DOCUMENTS

WO 2022212792 A1 10/2022

OTHER PUBLICATIONS

Grois D (Comcast)., et al., "Proposed Text: Film Grain Synthesis Technology for Video Applications (Draft 3)", Joint Video Experts Team (JVET) of ITU-T SG 16 WP 3 and ISO/IEC JTC 1/SC 29, 28th Meeting, Mainz, DE, Oct. 20, 2022-Oct. 28, 2022, No. JVET-AB0042-v2, m60721, Oct. 23, 2022, XP030304433, 45 pages, paragraphs [0006], [0007], figures 7, 8, 17, 18.
(Continued)

*Primary Examiner* — Rebecca A Volentine
(74) *Attorney, Agent, or Firm* — Polsinelli LLP

(57) ABSTRACT

Systems and methods for decoding are described herein. For example, a process can include obtaining luma values associated with a reconstructed video frame. The process can further include generating representative luma values based on the luma values associated with the reconstructed video frame. The process can include storing the representative luma values associated with the reconstructed video frame in a memory. The process can further include obtaining noise pixel data associated with the reconstructed video frame. The process can further include generating, using the representative luma values and the noise pixel data, chroma film
(Continued)

grain noise pixels associated with the reconstructed video frame. The process can further include applying the chroma film grain noise pixels to the reconstructed video frame.

18 Claims, 15 Drawing Sheets

(51) Int. Cl.

| | |
|---|---|
| ***H04N 19/182*** | (2014.01) |
| ***H04N 19/186*** | (2014.01) |
| ***H04N 19/70*** | (2014.01) |

(56) References Cited

OTHER PUBLICATIONS

International Search Report and Written Opinion—PCT/US2023/077654—ISA/EPO—Jan. 24, 2024.

Tourapis A.M (Apple)., et al., "Film Grain Synthesis Support in AVC and HEVC", Joint Collaborative Team on Video Coding (JCT-VC), of ITU-T SG 16 WP 3 and ISO/IEC JTC 1/SC 29/WG 11, 38th Meeting: Brussels, BE, Jan. 10, 2020-Jan. 17, 2020, No. JCTVC-AL0022-v1, m52579, Jan. 7, 2020, XP030224361, pp. 1-7, paragraphs [0001], [0003].

* cited by examiner

SYSTEMS AND METHODS OF VIDEO DECODING WITH DYNAMIC NOISE RECONSTRUCTION

CROSS-REFERENCE TO RELATED APPLICATION

This application is a 371 National Stage of PCT Application No. PCT/US2023/077654, filed on Oct. 24, 2023, entitled "SYSTEMS AND METHODS OF VIDEO DECODING WITH DYNAMIC NOISE RECONSTRUCTION", which claims priority to India Patent Application No. 202241061585, filed on Oct. 28, 2022, and assigned to the assignee hereof. The disclosure of the prior Applications are considered part of and is incorporated by reference into this Patent Application.

FIELD

This application is related to video decoding and decompression. More specifically, this application relates to systems and methods of performing video decoding in which film grain or another type of noise is reconstructed and added into the decoded video dynamically.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, cellular or satellite radio telephones, mobile phones (e.g., so-called "smart phones"), video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. The large amount of video data needed to meet these demands place a burden on communication networks and devices that process and store the video data.

Digital video devices can implement video coding techniques to compress video data. Video coding can be performed according to one or more video codecs and/or coding formats. For example, video codecs and/or coding formats include versatile video coding (VVC), Essential Video Coding (EVC), high-efficiency video coding (HEVC), VP8, VP9, advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media and SMPTE 421 (also known as VC-1), among others. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. A goal of video decoding techniques is to recreate the original video data as closely as possible from the compressed video data. With ever-evolving video services becoming available, coding and decoding techniques with improved coding and decoding efficiencies are needed. In some cases, a video may include film grain or other types of noise. Film grain can provide a desirable aesthetic effect in a video, and it can be desirable for film grain to be retained through encoding and decoding processes. However, in some video codecs/formats, film grain can be lost or degraded in the encoding and decoding processes. Further, in some video codecs/formats, the randomness of film grain or other types of noise can make it difficult to compress a video with film grain as much as a similar video without film grain.

SUMMARY

Systems and techniques are described for video decoding, for instance involving film grain or another type of noise that is reconstructed by a decoder and added into a decoded video dynamically. According to at least one example, a method is provided for device function. The method includes: obtaining luma values associated with a reconstructed video frame; generating representative luma values based on the luma values associated with the reconstructed video frame; storing the representative luma values associated with the reconstructed video frame in a memory; obtaining noise pixel data associated with the reconstructed video frame; generating, using the representative luma values and the noise pixel data, chroma film grain noise pixels associated with the reconstructed video frame; and applying the chroma film grain noise pixels to the reconstructed video frame.

In another example, an apparatus for device function is provided that includes at least one memory and at least one processor coupled to the at least one memory. The at least one processor is configured to: obtain luma values associated with a reconstructed video frame; generating representative luma values based on the luma values associated with the reconstructed video frame; store the representative luma values associated with the reconstructed video frame in a memory; obtain noise pixel data associated with the reconstructed video frame; generating, use the representative luma values and the noise pixel data, chroma film grain noise pixels associated with the reconstructed video frame; and apply the chroma film grain noise pixels to the reconstructed video frame.

In another example, a non-transitory computer-readable medium is provided that has stored thereon instructions that, when executed by one or more processors, cause the one or more processors to: obtain luma values associated with a reconstructed video frame; generating representative luma values based on the luma values associated with the reconstructed video frame; store the representative luma values associated with the reconstructed video frame in a memory, obtain noise pixel data associated with the reconstructed video frame; generating, use the representative luma values and the noise pixel data, chroma film grain noise pixels associated with the reconstructed video frame; and apply the chroma film grain noise pixels to the reconstructed video frame.

In another example, an apparatus for device function is provided. The apparatus includes: means for obtaining luma values associated with a reconstructed video frame; generating representative luma values based on the luma values associated with the reconstructed video frame; means for storing the representative luma values associated with the reconstructed video frame in a memory; means for obtaining noise pixel data associated with the reconstructed video frame; generating, means for using the representative luma values and the noise pixel data, chroma film grain noise pixels associated with the reconstructed video frame; and means for applying the chroma film grain noise pixels to the reconstructed video frame.

In some aspects, one or more of the apparatuses described herein is/are part of, and/or include(s) a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus(es) includes a camera or multiple cameras for capturing one or more images. In some aspects, the apparatus(es) further includes a display for displaying one or more images, notifications, and/or other displayable data. In some aspects, the apparatuses described above can include one or more sensors (e.g., one or more inertial measurement units (IMUs), such as one or more gyroscopes, one or more gyroscopes or gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
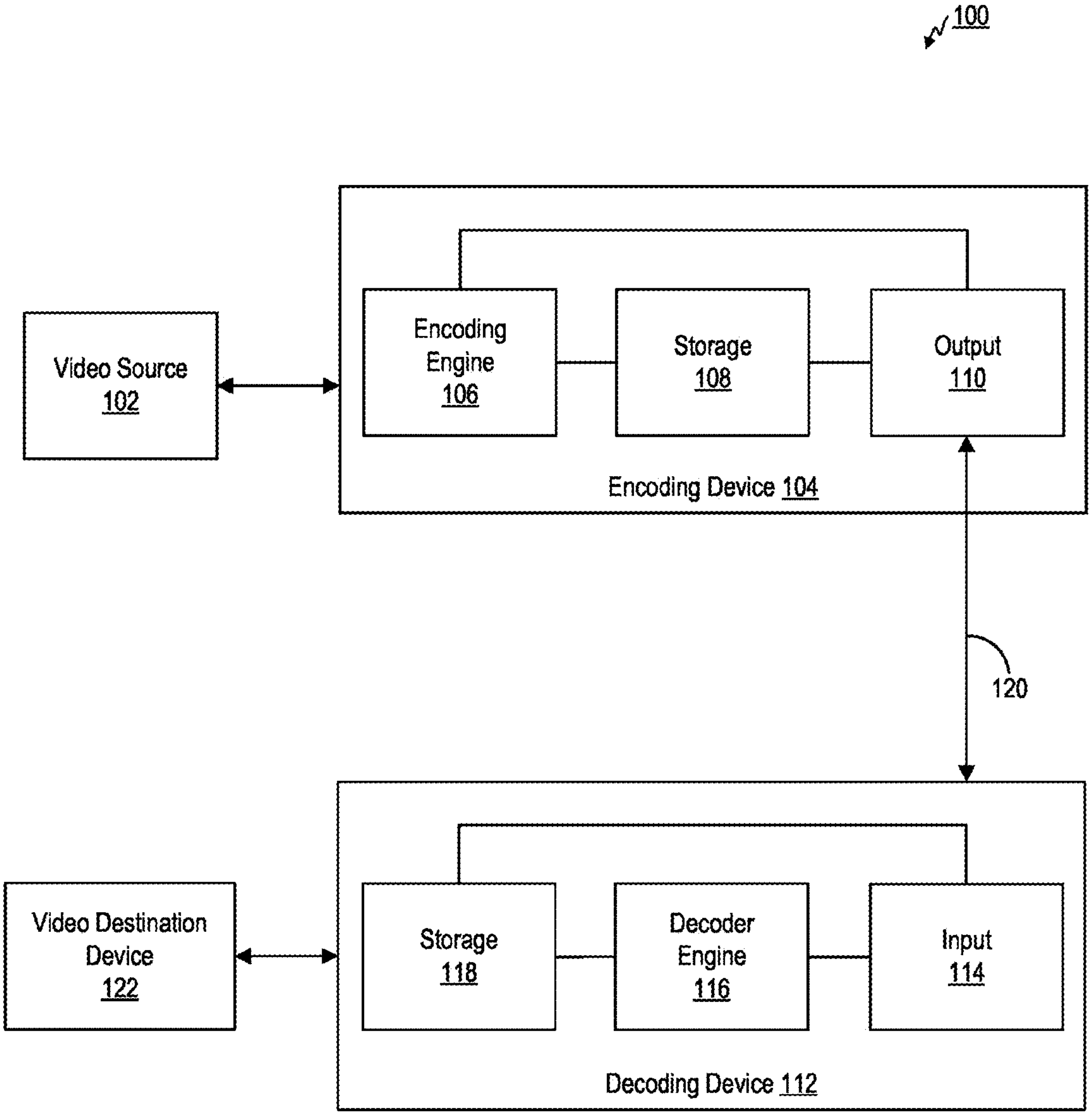
FIG. 1 is a block diagram illustrating an example of a system including an encoding device and a decoding device, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill. Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is targeted to.

One technique to compress an image is by subsampling chroma components. Luma information defines most of the picture because contrast forms the shapes represented by the video frame output and is more visually perceivable than the chroma components. Chroma components have less visual impact and reducing the size of the chroma components can decrease the size of the encoded video without significantly impacting the quality of the video. In some aspects, luma represents a third of the video data while chroma represents two-thirds, and subsampling the chroma components can reduce the encoded video size by half.

In some cases, a video may include film grain or other types of noise. Film grain can provide a desirable aesthetic effect in a video, and it can be desirable for film grain to be retained through encoding and decoding processes. However, in some video codecs/formats, film grain can be lost or degraded in the encoding and decoding processes. Further, in some video codecs/formats, the randomness of film grain or other types of noise can make it difficult to compress a video with film grain as much as a similar video without film grain.

Systems and techniques are described for video decoding, for instance, involving film grain or another type of noise that is reconstructed by a decoder and added into a reconstructed video frame dynamically. Film grain is considered part of the creative aspect of film and videography and can be preserved while encoding by an encoder into an encoded stream. In some examples, noise pixel data can be encoded into the video that represents a random associated with a grain of film and a decoder that decodes video frames into a reconstructed video frame generates a grain array corresponding to an encoded video frame that is divided into blocks. The decoder generates random offsets for the blocks of the encoded video frame. The decoder retrieves the noise pixel data from the grain array according to the random offsets based on positions of the noise pixel data in a noise image as compared to positions of the blocks in the encoded video frame. The decoder blends a portion of the noise pixel data in the noise image to generate a blended portion of the noise pixel data. The portion of the noise pixel data is located at positions in the noise image that correspond to boundaries between blocks of the plurality of blocks of the encoded video frame. The decoder adds at least the blended portion of the noise pixel data to reconstructed video frame data to generate output video frame data, the reconstructed video frame data generated based on the encoded video frame.

The codec systems and techniques described herein provide a number of technical improvements over prior codec systems. For instance, the codec systems and techniques described herein allow for reconstruction of film grain or other types of noise in decoded video, providing an improvement over codec systems in which film grain can be lost or degraded in the encoding and/or decoding processes. The codec systems and techniques described herein allow for the video to be compressed more than other codec systems. For instance, by filtering the noise out before encoding a video, generating grain parameters based on the noise that is filtered out, reconstructing the noise based on the grain parameters, and adding the reconstructed noise back into the decoded video, the encoded video can be compressed more heavily by the codec systems and techniques described herein, and still reconstruct film grain, than by codec systems that attempt to preserve film grain during encoding. This increased compression can correspond to reduced bit rate (in an illustrative example, by approximately 50%) over codec systems that attempt to preserve film grain during encoding. The codec systems and techniques described herein improve efficiency of reconstruction and addition of film grain by allowing for reconstruction and addition of film grain to occur dynamically (e.g., on a pixel-by-pixel basis), improving efficiency over codecs that wait for the entire frame of film grain data to be reconstructed before adding the film grain data to the decoded video. In some examples, dynamic film grain reconstruction of the codec systems and techniques described herein can provide a bandwidth savings of 778 megabytes per second (MBps) (given a 1080p resolution and a 120 frame per second (fps) frame rate) to 12,458 MBps (given an 8K resolution and a 120 fps frame rate). In some examples, dynamic film grain reconstruction of the codec systems and techniques described herein can reduce memory read and write cycles used during decoding, and therefore improves the speed of decoding streams, especially for higher bit-rate streams. In some examples, the speed and efficiency improvements for the codec systems and techniques described herein provide improved usability for low-latency use-cases, such as extended reality (XR) (e.g., virtual reality (VR), augmented reality (AR), and/or mixed reality (MR)).

Systems and techniques are described for video decoding with film grain or another type of noise include generating representative luma values (e.g., average luma values) based on luma values associated with a reconstructed video frame. The codec systems and techniques described herein generates the representative luma values before determining luma film grain noise pixels and chroma film grain noise pixels. For instance, by generating the representative luma values before determining luma film grain noise pixels and chroma film grain noise pixels, the codec systems and techniques can reduce read and write cycles to a memory device and reduce power consumption. In one example, the codec systems and techniques can reduce 600 MBps of bandwidth consumption when the codec systems and techniques are upscaling video by a factor of two.

Various aspects of the application will be described with respect to the figures. FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore new coding tools for the next generation of video coding standard, named Versatile Video Coding (VVC). The reference software is called VVC Test Model (VTM) (or JEM (joint exploration model)). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video codecs and/or coding formats for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable codecs and/or coding formats already available or not yet available or developed. Accordingly, while the techniques and systems described herein may be described with reference to a particular video coding standard, one of ordinary skill in the art will appreciate that the description should not be interpreted to apply only to that particular standard.

Many embodiments described herein provide examples using the JEM model, VVC, the HEVC standard, and/or extensions thereof. However, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

Two classes of Network Abstraction Layer (NAL) units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra-prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters (($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ( ) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ( ), a vertical component of the motion vector ( ), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixels of the current block and pixels of the prediction block. In some examples, the residual block may be represented in a two-dimensional block format (e.g., a two-dimensional matrix or array of pixels). In such examples, the residual block is a two-dimensional representation of the pixels.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible piano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

In HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, as described below, one or more stored local illumination compensation (LIC) flags can be included along with stored motion vectors in a MV candidate list.

In examples where a MV candidate list is used for motion prediction (and where applicable, illumination compensation) of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g. information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2:
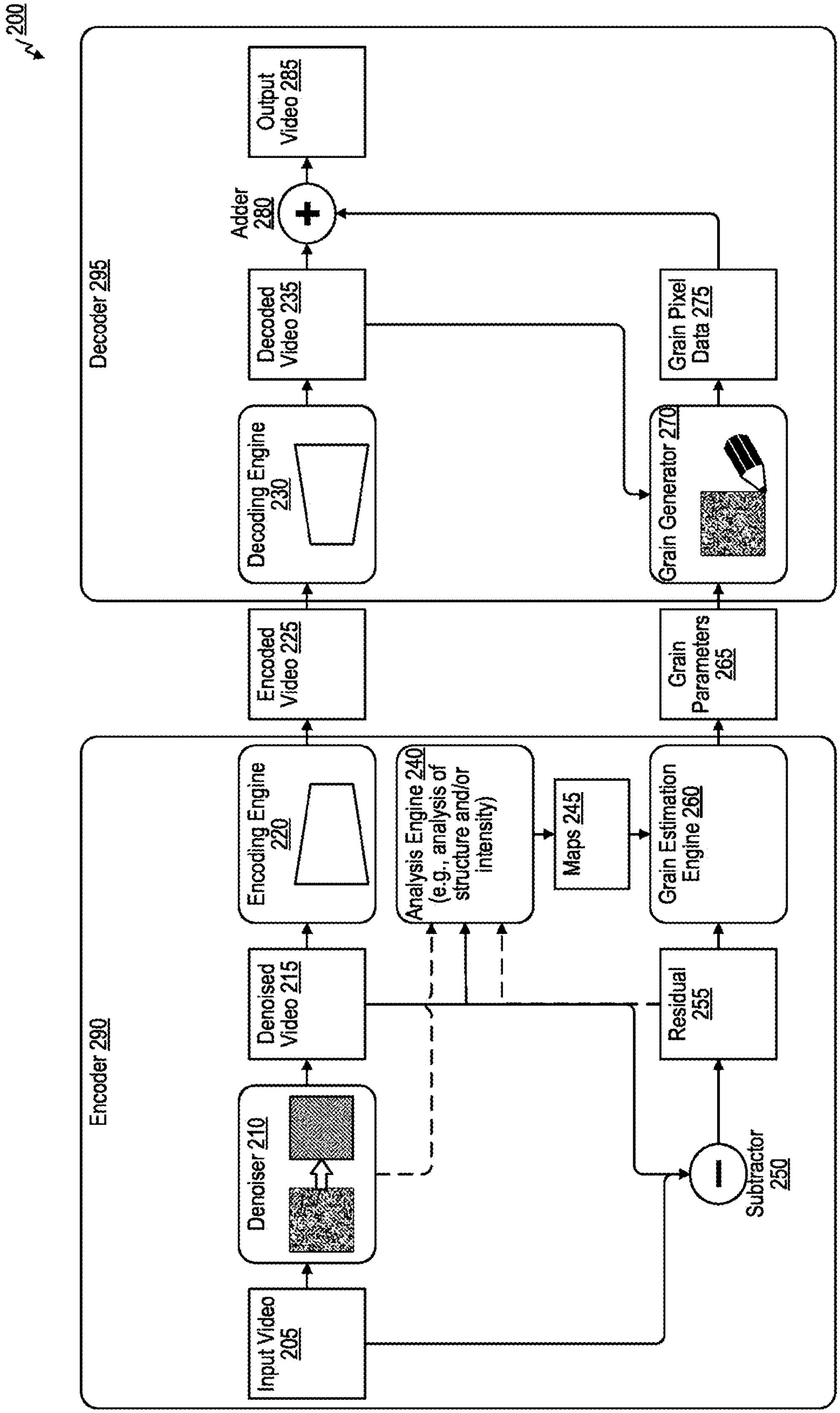
FIG. 2 is a block diagram illustrating a codec system with an encoder that filters out film grain noise and a decoder that reconstructs the film grain noise, in accordance with some examples.

FIG. 2 is a block diagram illustrating a codec system 200 with an encoder 290 that filters out film grain noise and a decoder 295 that reconstructs the film grain noise. The encoder 290 may be an example of the encoding device 104, the encoding engine 106, the computing system 1400, the processor 1410, or a combination thereof. The decoder 295 may be an example of the decoding device 112, the decoder engine 116, the computing system 1400, the processor 1410, or a combination thereof.

The encoder 290 receives an input video 205 with at least one video frame, for instance from a video source 102. The input video 205 includes film grain or other noise data. In some cases, film grain can provide a desirable aesthetic effect in a video, and it can be desirable for film grain to be retained through an encoding and decoding processes. However, the randomness and rapid changes of film grain and other noise data can add complexity to a video and therefore reduce the efficiency of encoding and/or compression. For instance, video compression is based on spatial and temporal prediction, while film grain and other noise data have high degrees of randomness in both spatial and temporal directions, making prediction difficult. Thus, to reduce the complexity of the input video 205 and improve the efficiency of encoding and/or compression of the input video 205, the encoder 290 denoises the input video 205 using a denoiser 210 to generate denoised video 215. The denoiser 210 can use any denoising algorithms or techniques, such as spatial filtering, transform domain filtering, wavelet thresholding, or a combination thereof. The encoder 290 then passes the denoised video 215 to an encoding engine 220 to generate encoded video 225. The encoding engine 220 can be an example of the encoding device 104, the encoding engine 106, the computing system 1400, the processor 1410, or a combination thereof. In some examples, the encoding engine 220 compresses the denoised video 215 to generate the encoded video 225.

The encoder 290 also includes a subtractor 250 that subtracts the denoised video 215 from the input video 205 to generate a residual 255. In some examples, the encoder 290 includes an analysis engine 240 that receives the input video 205, the denoised video 215, data about the denoising process from the denoiser 210, and/or the residual 255. Based on this data, the analysis engine 240 performs an analysis of the structure and/or intensity of the noise that is removed from the input video 205 by the denoiser 210 to generate the denoised video 215. In some examples, the analysis engine 240 generates maps 245 that map out the structure and/or intensity of the noise that is removed from the input video 205 by the denoiser 210 at various positions to a corresponding position in a video frame of the input video 205, the denoised video 215, and/or the encoded video 225. The encoder 290 includes a grain estimation engine 260 that generates grain parameters 265 based on the maps 245 from the analysis engine 240 and/or based on the residual 255. In some examples, the maps 245 and/or the grain parameters 265 may include an autoregressive model associated with the grain that is removed from the input video 205 by the denoiser 210. In some examples, maps 245 and/or the grain parameters 265 may model grain strength as a function of intensity. In some examples, the grain parameters 265 include an initial random state, and indication of bit depth, an indication of grain scale, or a combination thereof.

The encoder 290 passes the encoded video 225 and the grain parameters 265 to the decoder 295. The decoder 295 includes a decoding engine 230 that decodes the encoded video 225 to generate decoded video 235. The decoding engine 230 may be an example of the decoding device 112, the decoder engine 116, the computing system 1400, the processor 1410, or a combination thereof. In some examples, the decoding engine 230 decompresses the encoded video 225 to generate the decoded video 235. The decoded video 235 is a reconstruction of the denoised video 215.

The decoder 295 also includes a grain generator 270 that generates grain pixel data 275 based on the grain parameters 265. In some examples, the grain pixel data 275 is a reconstruction of the noise that is removed from the input video 205 by the denoiser 210. In some examples, the grain pixel data 275 is a reconstruction of the residual 255. In some examples, the grain pixel data 275 is synthesized grain data that shares some attributes (e.g., indicated by the grain parameters 265) in common with the noise that is removed from the input video 205 by the denoiser 210. The decoder 295 includes an adder 280 that adds the grain pixel data 275 to the decoded video 235 to generate output video 285.

In some examples, the grain generator 270 generates an entire frame of the grain pixel data 275 before the decoder 295 adds the grain pixel data 275 to the decoded video 235 using the adder 280 to generate the output video 285. An example of such a decoder 295 is illustrated as part of the decoder system 600 of FIG. 6.

In some examples, the grain generator 270 generates portions of the frame of grain pixel data 275 after decoding frames of the video, and the decoder 295 adds the grain pixel data 275 to the decoded video 235 a portion at a time dynamically using the adder 280. The decoder 295 can therefore generate the output video 285 a portion at a time dynamically, eventually generating the entire frame of the output video 285 after the grain generator 270 eventually generates the entire frame of the grain pixel data 275. Such a decoder 295 can provide efficiency improvements over a decoder that generates the entire frame of the grain pixel data 275 before adding the grain pixel data 275 to the decoded video 235 to generate the output video 285 by allowing parallel grain generation and grain addition. For instance, the adder 280 can add a first portion of the grain pixel data 275 to the decoded video 235 while the grain generator 270 is generating a second portion of the grain pixel data 275

Figure 3:
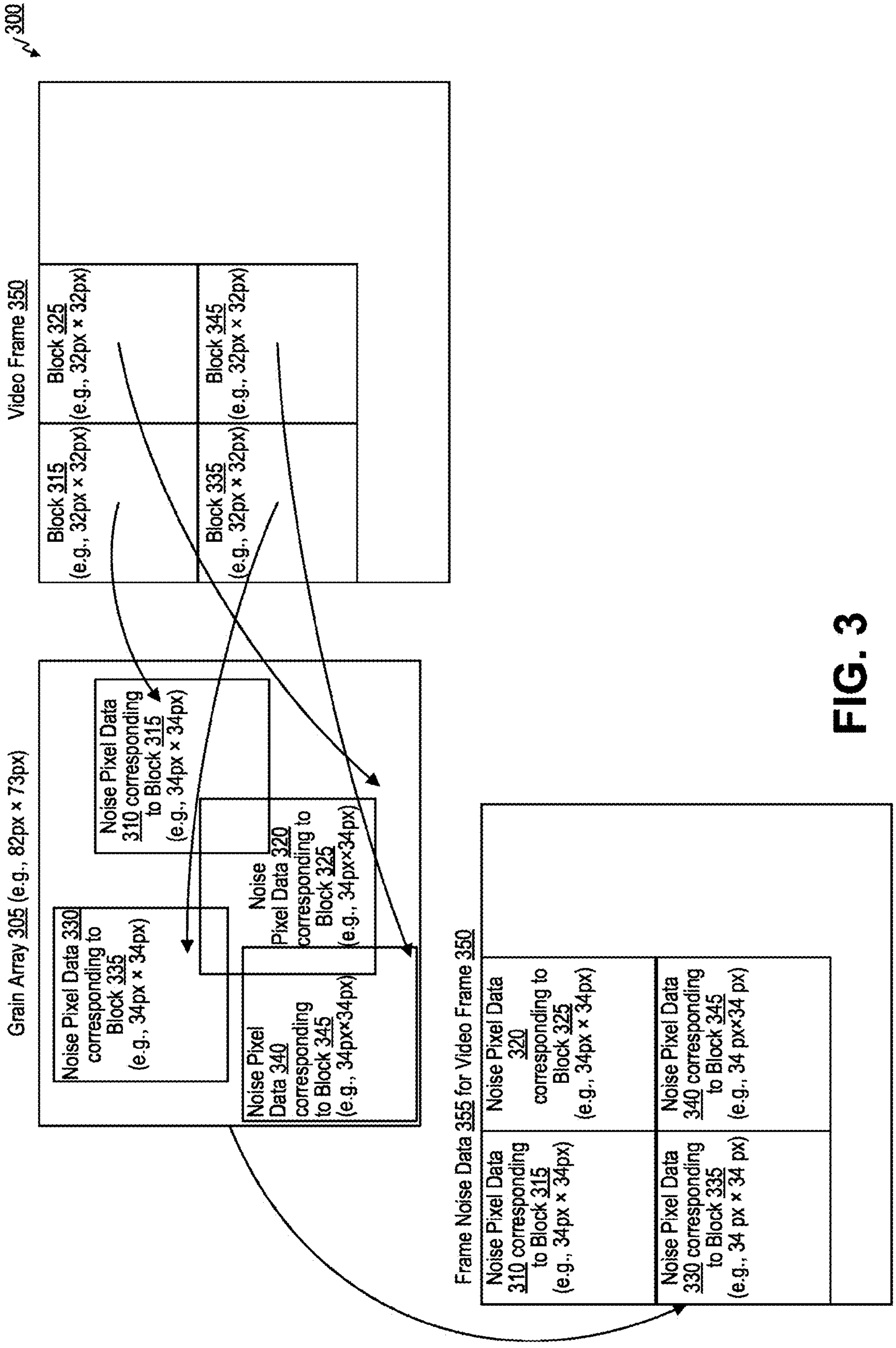
FIG. 3 is a conceptual diagram illustrating generation of noise pixel data corresponding to various blocks of a video frame based on respective offsets, in accordance with some examples.

FIG. 3 is a conceptual diagram 300 illustrating generation of noise pixel data corresponding to various blocks of a video frame 350 based on respective offsets. The grain generator 270 (e.g., using the white noise generator 610 and/or the auto regressive filter 615) generates a grain array 305 based on the grain parameters 265. In the illustrative example of FIG. 3, the grain array 305 has dimensions of 82 pixels (px) by 73 px. In some examples, the grain array 305 may be larger or smaller than this size, in either dimension.

The video frame 350 is divided into multiple blocks. In the illustrative example of FIG. 3, the video frame 350 is divided into at least four blocks, including block 315, block 325, block 335, and block 345. In some examples, the video frame 350 can be divided into more than four blocks or fewer than four blocks. In the illustrative example of FIG. 3, each block of the blocks has dimensions of 32 px by 32 px. In some examples, the blocks (e.g., block 315, block 325, block 335, and block 345) may be larger or smaller than this size, in either dimension.

The grain generator 270 (e.g., using the random offset generator 635) generates random offsets respectively corresponding to each of the blocks of the video frame 350 (e.g., block 315, block 325, block 335, and block 345). Based on the random offsets, the grain generator 270 retrieves, from the grain array 305, noise pixel data 310 corresponding to the block 315, noise pixel data 320 corresponding to the block 325, noise pixel data 330 corresponding to the block 335, and noise pixel data 340 corresponding to the block 345. A set of random offsets for a given block may include a horizontal offset and a vertical offset from an origin point along the grain array 305. The origin point may be a point with coordinates (0, 0) of the grain array 305 at one of the corners of the grain array 305, such as the upper-left corner, the bottom-left corner, the upper-right corner, or the bottom-right corner. A set of random offsets for a given block indicates a position along the grain array 305 that the grain generator 270 is to retrieve noise pixel data corresponding to that block.

Figure 4:
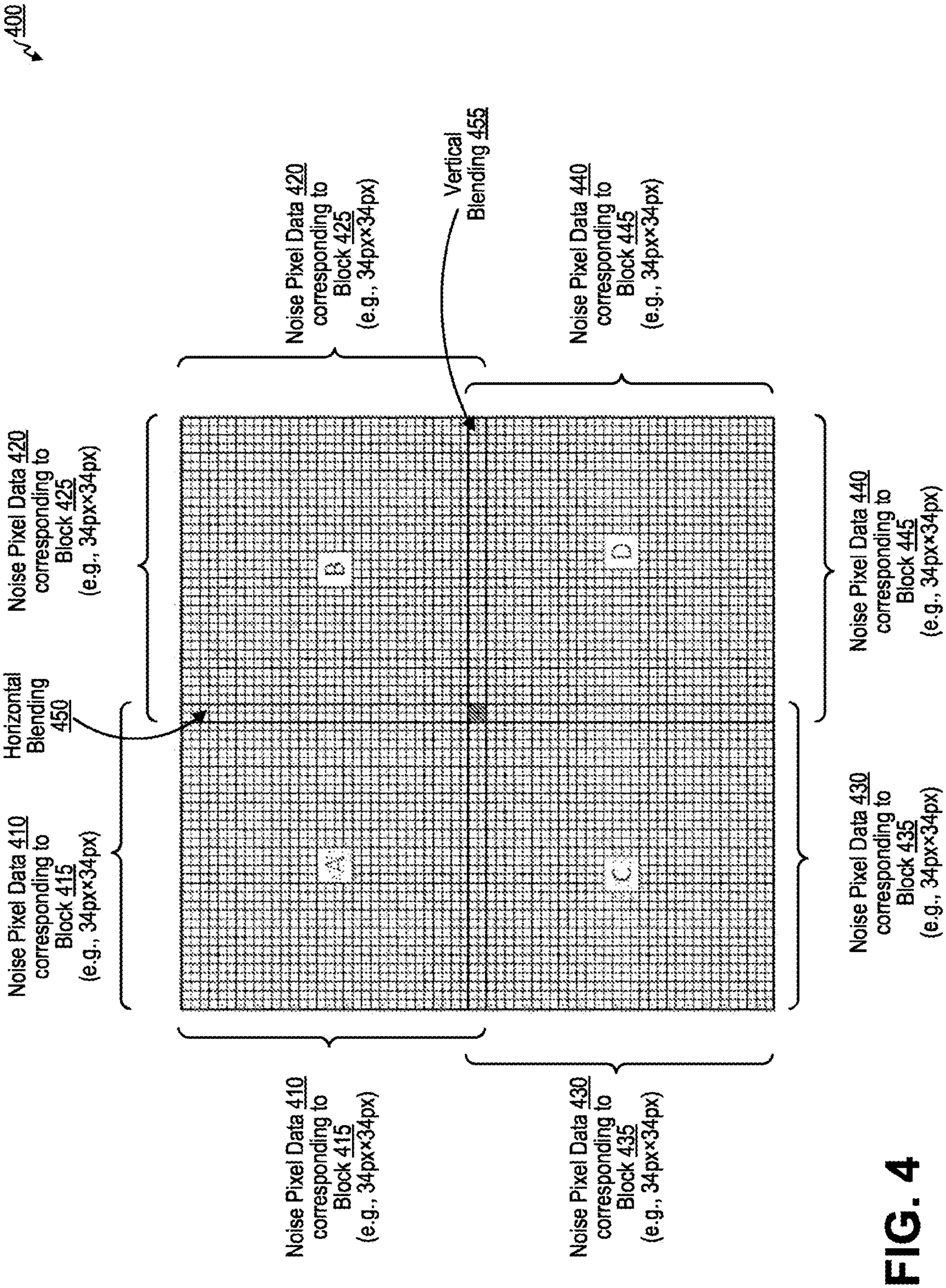
FIG. 4 is a conceptual diagram illustrating use of horizontal blending and vertical blending at overlapping portions of noise pixel data corresponding to different blocks of a video frames, in accordance with some examples.

For instance, the grain generator 270 (e.g., using the random offset generator 635) generates a first set of random offsets corresponding to the block 315, with the first set of random offsets indicating a position along the grain array 305 from which to retrieve the noise pixel data 310 corresponding to the block 315. The grain generator 270 generates a second set of random offsets corresponding to the block 325, with the second set of random offsets indicating a position along the grain array 305 from which to retrieve the noise pixel data 320 corresponding to the block 325. The grain generator 270 generates a third set of random offsets corresponding to the block 335, with the third set of random offsets indicating a position along the grain array 305 from which to retrieve the noise pixel data 330 corresponding to the block 335. The grain generator 270 generates a fourth set of random offsets corresponding to the block 345, with the fourth set of random offsets indicating a position along the grain array 305 from which to retrieve the noise pixel data 340 corresponding to the block 345. In the illustrative example of FIG. 3, each set of noise pixel data (e.g., the noise pixel data 310, the noise pixel data 320, the noise pixel data 330, and the noise pixel data 340) has dimensions of 34 px by 34 px. The additional 2 pixels in each dimension (beyond the 32 px by 32 px dimensions of the blocks) can be used for blending as illustrated in FIG. 4. In some examples, the blocks (e.g., block 315, block 325, block 335, and block 345) may be larger or smaller than this size, in either dimension.

The grain generator 270 can arrange each set of noise pixel data (e.g., the noise pixel data 310, the noise pixel data 320, the noise pixel data 330, and the noise pixel data 340) together according to the arrangement that the corresponding blocks (e.g., block 315, block 325, block 335, and block 345) have in the video frame 350 to generate frame noise data 355. The frame noise data 355 can represent grain pixel data 275 that the decoder 295 can add to decoded video 235 using the adder 280 to generate output video 285. In some examples, the noise pixel data (e.g., the noise pixel data 310, the noise pixel data 320, the noise pixel data 330, and the noise pixel data 340) can represent grain pixel data 275 that the decoder 295 can add to decoded video 235 using the adder 280 to generate output video 285.

In some examples, the grain array 305 is a luminosity (luma) grain array 305 with grain on a luminosity channel, and the noise pixel data (e.g., noise pixel data 310, noise pixel data 320, noise pixel data 330, and noise pixel data 340) includes noise on the luminosity channel. In some examples, the grain array 305 is a chroma grain array 305 with grain on one or more chroma channels corresponding to one or more colors, and the noise pixel data (e.g., noise pixel data 310, noise pixel data 320, noise pixel data 330, and noise pixel data 340) includes noise on the one or more chroma channels.

FIG. 4 is a conceptual diagram 400 illustrating use of horizontal blending 450 and vertical blending 455 at overlapping portions of noise pixel data corresponding to different blocks of video frames. For instance, four sets of noise pixel data, with dimensions 34 px by 34 px each, are illustrated in FIG. 4. The four sets of noise pixel data include noise pixel data 410 (labeled "A") that corresponds to a block 415 of a video frame (e.g., of output 110, input 114, input video 205, denoised video 215, encoded video 225, decoded video 235, and/or video frame 350), noise pixel data 420 (labeled "B") that corresponds to a block 425 of the video frame, noise pixel data 430 (labeled "C") that corresponds to a block 435 of the video frame, and noise pixel data 440 (labeled "D") that corresponds to a block 445 of the video frame. The four sets of noise pixel data in FIG. 4 (e.g., noise pixel data 410, noise pixel data 420, noise pixel data 430, and noise pixel data 440) may be examples of the four sets of noise pixel data in FIG. 3 (e.g., noise pixel data 310, noise pixel data 320, noise pixel data 330, and noise pixel data 340), or vice versa. Similarly, the four blocks in FIG. 4 (e.g., block 415, block 425, block 435, and block 445) may be examples of the four blocks in FIG. 3 (e.g., block 315, block 325, block 335, and block 345), or vice versa.

The four sets of noise pixel data in FIG. 4 (e.g., noise pixel data 410, noise pixel data 420, noise pixel data 430, and noise pixel data 440) are arranged so that two adjacent lines of pixels (e.g., rows or columns of pixels) at a given edge of a first set of noise pixel data overlap over two adjacent lines of pixels (e.g., rows or columns of pixels) at a corresponding edge of a second set of noise pixel data that is arranged adjacent to the first set of noise pixel data. For instance, the two rightmost columns of the noise pixel data 410 overlap with the two leftmost columns of the noise pixel data 420, the two rightmost columns of the noise pixel data 430 overlap with the two leftmost columns of the noise pixel data 440, the two bottommost columns of the noise pixel data 410 overlap with the two topmost columns of the noise pixel data 430, and the two bottommost columns of the noise pixel data 420 overlap with the two topmost columns of the noise pixel data 440.

The grain generator 270 can perform horizontal blending 450 (e.g., horizontal blending 640, horizontal and/or vertical blending) to blend overlapping columns of pixels from different adjacent sets of noise pixel data. For instance, the grain generator 270 can perform the horizontal blending 450 to blend the two rightmost columns of the noise pixel data 410 with the two leftmost columns of the noise pixel data 420, and to blend the two rightmost columns of the noise pixel data 430 with the two leftmost columns of the noise pixel data 440.

The grain generator 270 can perform vertical blending 455 (e.g., vertical blending 645, horizontal and/or vertical blending) to blend overlapping rows of pixels from different adjacent sets of noise pixel data. For instance, the grain generator 270 can perform the vertical blending 455 to blend the two bottommost columns of the noise pixel data 410 with the two topmost columns of the noise pixel data 430, and to blend the two bottommost columns of the noise pixel data 420 with the two topmost columns of the noise pixel data 430.

In some examples, the grain generator 270 can perform horizontal blending 450 before performing the vertical blending 455, or vice versa. In some examples, the grain generator 270 can perform horizontal blending 450 before performing the vertical blending 455 at least partially in parallel. In some examples, to perform the horizontal blending 450 and/or the vertical blending 455, the grain generator 270 can add noise pixel data from the overlapping lines of the two sets of noise pixel data to one another. In some examples, to perform the horizontal blending 450 and/or the vertical blending 455, the grain generator 270 can subtract noise pixel data from the overlapping lines of the two sets of noise pixel data from one another. In some examples, to perform the horizontal blending 450 and/or the vertical blending 455, the grain generator 270 can multiply noise pixel data from the overlapping lines of the two sets of noise pixel data by one another. In some examples, to perform the horizontal blending 450 and/or the vertical blending 455, the grain generator 270 can divide noise pixel data from the overlapping lines of the two sets of noise pixel data by one another. In some examples, to perform the horizontal blending 450 and/or the vertical blending 455, the grain generator 270 can average noise pixel data from the overlapping lines of the two sets of noise pixel data with one another. In some examples, to perform the horizontal blending 450 and/or the vertical blending 455, the grain generator 270 can keep the blended values within a predetermined range, for instance by bringing any blended values that exceed an upper bound threshold down to the upper bound threshold, and by bringing any blended values that are less than a lower bound threshold up to the lower bound threshold.

Figure 5:
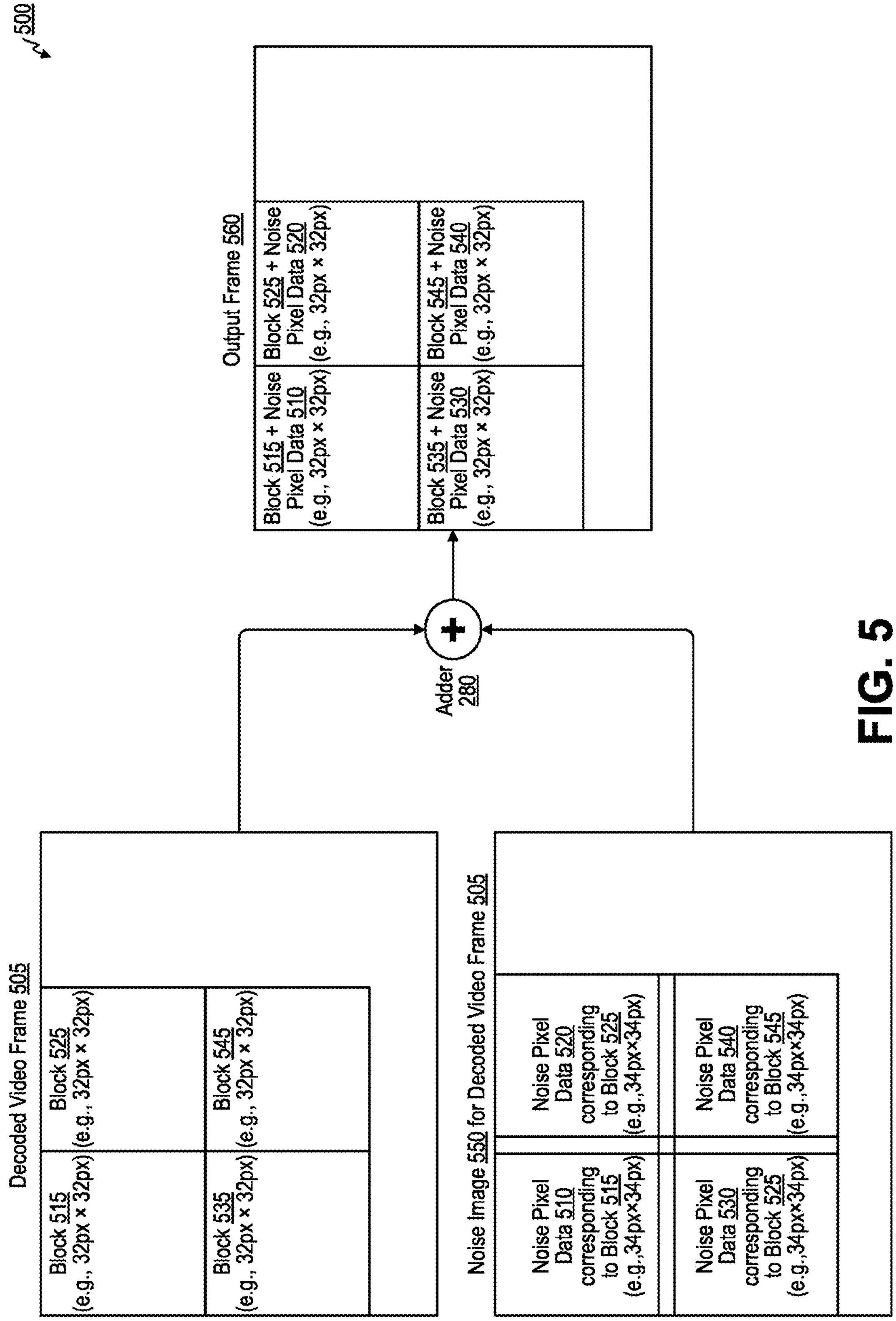
FIG. 5 is a conceptual diagram illustrating addition of a noise image to a decoded video frame using an adder to generate an output frame, in accordance with some examples.

FIG. 5 is a conceptual diagram 500 illustrating addition of a noise image 550 to a decoded video frame 505 using an adder 280 to generate an output frame 560. The decoded video frame 505 is divided into at least four blocks with dimensions 32 px by 32 px, including block 515, block 525, block 535, and block 545. The noise image 550 for the decoded video frame 505 includes four sets of noise pixel data corresponding to the four blocks of the decoded video frame 505, including noise pixel data 510 corresponding to block 515, noise pixel data 520 corresponding to block 525, noise pixel data 530 corresponding to block 535, and noise pixel data 540 corresponding to block 545. The four sets of noise pixel data (e.g., noise pixel data 510, noise pixel data 520, noise pixel data 530, and noise pixel data 540) each have dimensions of 34 px by 34 px, and are arranged in the same order and/or arrangement as the four blocks (e.g., block 515, block 525, block 535, and block 545) with some overlap between adjacent sets of and noise pixel data. The noise image 550 may include horizontal blending 450 and/or vertical blending 455 at the overlapping areas between the adjacent sets of and noise pixel data. In some examples, the noise image 550. In some examples, the grain generator 270 can generate the noise image 550 using piecewise linear interpolation with the corresponding pixels of the decoded video frame 505.

The decoder 295 uses the adder 280 to add the noise image 550 to the decoded video frame 505 to generate the output frame 560. The output frame 560 includes a first 32 px by 32 px block region that includes the noise pixel data 510 of the noise image 550 (e.g., with horizontal blending 450 and/or vertical blending 455 with adjacent set(s) of noise pixel data) added to the block 515 of the decoded video frame 505. The output frame 560 also includes a second block region that includes the noise pixel data 520 of the noise image 550 (e.g., with horizontal blending 450 and/or vertical blending 455 with adjacent set(s) of noise pixel data) added to the block 525 of the decoded video frame 505, a third block region that includes the noise pixel data 530 of the noise image 550 (e.g., with horizontal blending 450 and/or vertical blending 455 with adjacent set(s) of noise pixel data) added to the block 535 of the decoded video frame 505, and a fourth block region that includes the noise pixel data 540 of the noise image 550 (e.g., with horizontal blending 450 and/or vertical blending 455 with adjacent set(s) of noise pixel data) added to the block 545 of the decoded video frame 505. In some examples, the decoder 295 can scale and/or round the noise image 550 before adding the noise image 550 to the decoded video frame 505. In some examples, the decoder 295 can perform piecewise linear interpolation on the noise image 550 with the corresponding pixels of the decoded video frame 505 before adding the noise image 550 to the decoded video frame 505.

Figure 6:
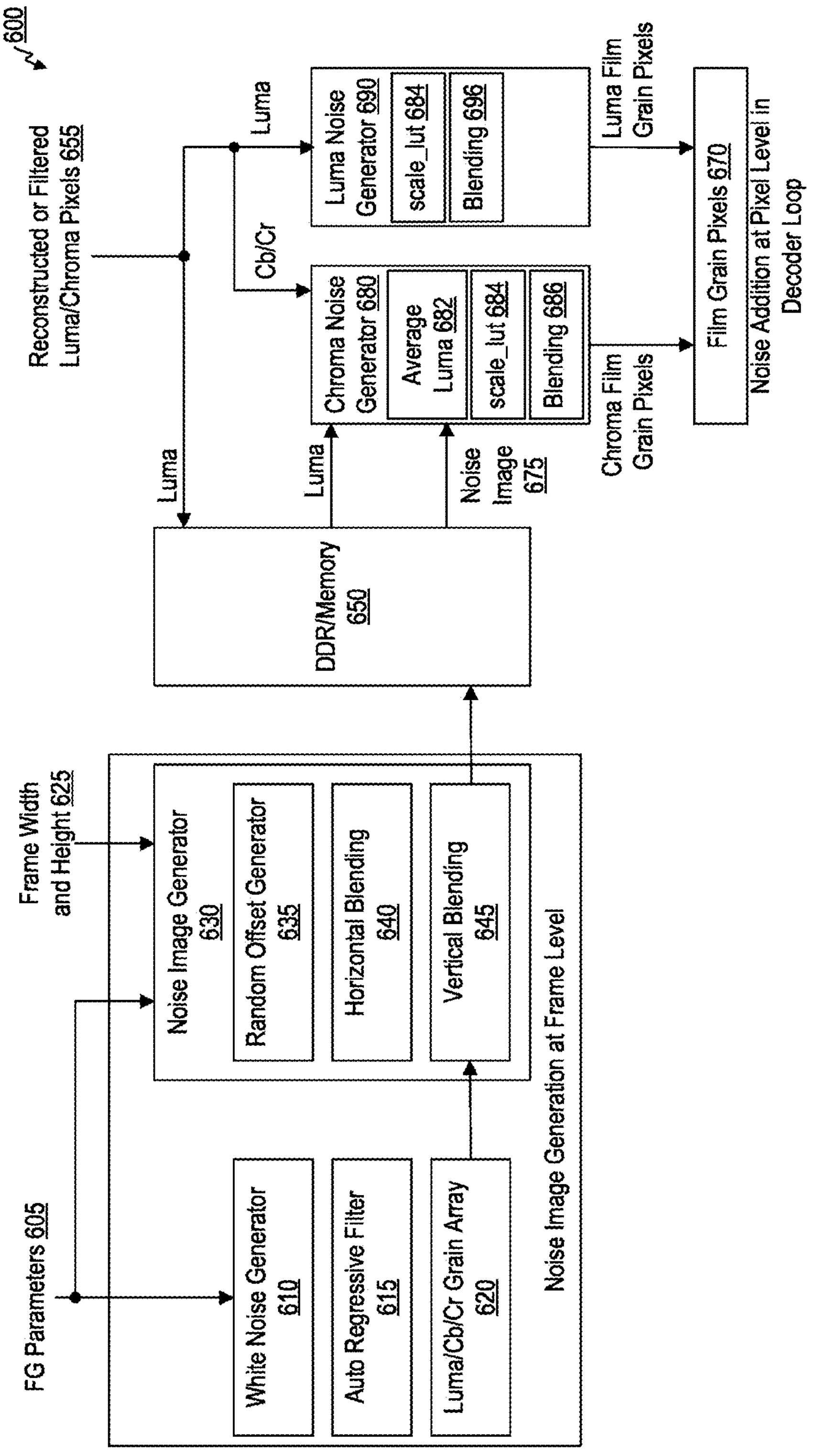
FIG. 6 is a block diagram illustrating a decoder system that generates noise data for an entirety of a video frame before adding the noise data to the video frame, in accordance with some examples.

FIG. 6 is a block diagram illustrating a decoder system 600 that generates noise data for an entirety of a video frame before adding the noise data to the video frame. The decoder system 600 receives film grain (FG) parameters 605, which are an example of the grain parameters 265. The decoder system 600 also receives frame width and height 625 (e.g., frame dimensions) of an encoded video 225 and/or a decoded video 235. The decoded video 235 includes reconstructed pixels 655, which are also received by the decoder system 600.

The decoder system generates a grain array 620 in luma (Y) and/or chroma (e.g., blue-difference ($C_B$) and/or red-difference ($C_R$)) channels based on the FG parameters 605 using a white noise generator 610 and an auto-regressive filter 615. In an illustrative example, the white noise generator 610 generates white noise for the grain array 620 based on the grain parameters 265 according to the Pseudocode 1 below:

Pseudocode 1

```
shift = 12 − BitDepth + grain_scale_shift
for ( y = 0; y < 73; y++ ) {
  for ( x = 0; x < 82; x++ ) {
    if (num_y_points > 0 ) {
      g = Gaussian_Sequence[ get_random_number( 11 ) ]
    } else {
      g = 0
    }
    LumaGrain[ y ][ x ] = Round2( g, shift )
  }
}
```

In Pseudocode 1 for the white noise generator 610 provided above, LumaGrain represents the luma grain array. BitDepth and grain_scale_shift can represent FG parameters 605.

In an illustrative example, the auto-regressive filter 615 generates the grain array 620 based on the white noise (generated using the white noise generator 610) based on the FG parameters 605 according to the Pseudocode 2 below:

Pseudocode 2

```
shift = ar_coeff_shift_minus_6 + 6
for (y = 3; y < 73; y++) {
  for (x = 3; x < 82 − 3; x++) {
    s = 0;
    pos = 0
    for (deltaRow = −ar_coeff_lag; deltaRow <= 0; deltaRow++) {
      for (deltaCol = −ar_coeff_lag; deltaCol <= ar_coeff_lag; deltaCol++) {
        if (deltaRow == 0 && deltaCol == 0) break
        c = ar_coeffs_y_plus_128[pos] − 128
        s += LumaGrain[y + deltaRow][x + deltaCol] * c
        pos++
      }
    }
    LumaGrain[y][x] = Clip3(GrainMin, GrainMax, LumaGrain[y][x] + Round2(s, shift))
  }
}
```

In Pseudocode 2 for the auto-regressive filter 615 provided above, ar_coeff_lag represents one of the FG parameters 605. In the example illustrated using the pseudocode, each filtered grain value generated using the auto-regressive filter 615 can be dependent on a maximum of 24 white noise values and/or filtered grain values given ar_coeff_lag equals to 3. The output of the auto-regressive filter 615 is the grain array 620.

A noise image generator 630 of the decoder system 600 generates a noise image 675 based on the grain array 620, the frame width and height 625, and in some cases the FG parameters 605. The noise image generator 630 includes a random offset generator 635 that generates random offsets for the different sets of noise pixel data (e.g., as in the random offsets for the noise pixel data 310, the noise pixel data 320, the noise pixel data 330, and the noise pixel data 340) to identify which portions of the grain array 620 the noise pixel data should be retrieved from. The noise image generator 630 includes respective engines for horizontal blending 640 (e.g., for horizontal blending 450) and vertical blending 645 (e.g., for vertical blending 455). The horizontal blending 640 and vertical blending 645 can blend overlapping lines of noise pixel data from adjacent sets of noise pixel data as illustrated in FIG. 4. The noise image generator 630 writes the resulting blended noise pixel data to memory 650, which may include double data rate (DDR) memory.

The noise image generator 630 can write the blended noise pixel data from the noise image, and/or from the blended noise stripes, in portions of 32px by 34px, 32px by 2px, and/or 32px by 32px at a time.

In some examples, the decoder system 600 performs sequential blending of film grain blocks (e.g., noise pixel data 310, noise pixel data 320, noise pixel data 330, noise pixel data 340, noise pixel data 410, noise pixel data 420, noise pixel data 430, noise pixel data 440, noise pixel data 510, noise pixel data 520, noise pixel data 530, noise pixel data 540) horizontally and vertically to generate the noise image 675 for the whole frame. The decoder system 600 writes the full frame width of horizontally blended noise stripes to memory 650. The decoder system 600 performs 2 extra pixel writes after horizontal blending, with 2 top line pixels read, and 2 pixels written after vertical blending for every 32 pixels in height for Luma). Similarly, the decoder system 600 performs 1 extra pixel write, 1 top pixel read, and 1 pixel write after vertical blending for every 16 pixels in height for Chroma Cb/Cr.

The decoder system 600 uses the reconstructed pixels 655 and the noise image 675 to generate film grain pixels 670 that are added to the reconstructed pixels 655 in the decoder loop. Film gain noise includes chroma components and luma components that are blended to generate a luma film grain noise and chroma film grain noise.

The decoder system 600 is configured to generate the generate film grain pixels 670 by generating a luma film grain noise pixels and chroma film grain noise pixels. For example, the decoder system includes a luma noise generator 690 for generating the luma film grain noise pixels and a chroma noise generator 680 for generating the chroma film grain noise pixels. The luma noise generator 690 includes a scaling look-up table (LUT) 684. The luma noise generator 690 is configured to receive the luma pixels from the reconstructed pixels 655 and noise pixels from the noise image 675 to create the luma film grain noise pixels by performing scaling using the scaling look-up table (LUT) 684 and performing various blending operations 696. An example of the generation of the luma film grain noise pixels is further described with reference to FIG. 8B.

The luma pixels are need for the chroma noise generator 680 based on various filtering operations described herein, and the luma pixels are stored in the memory 650. The chroma noise generator 680 is configured to use the chroma pixels from the reconstructed pixels 655 to generate the chroma film grain noise pixels based on the FG parameters 605. For example, chroma noise film grain pixels are generated based on the FG parameters 605 according to Pseudocode 3 below:

Pseudocode 3

```
for (y = 0; y < ((h + subY) >> subY); y++) {
  for (x = 0; x < ((w + subX) >> subX); x++) {
    lumaX = x << subX;
    lumaY = y << subY
    lumaNextX = Min(lumaX + 1, w - 1)
    if (subX)
      averageLuma = Round2(OutY[lumaY][lumaX] + OutY[lumaY][lumaNextX], 1)
    else
      averageLuma = OutY[lumaY][lumaX]
    if (num_cb_points > 0 || chroma_scaling_from_luma) {
      cb_orig = OutU[y][x]
      if (chroma_scaling_from_luma) {
        merged = averageLuma
      } else {
        combined = averageLuma * (cb_luma_mult - 128) + cb_orig * (cb_mult - 128)
        merged = Clip1((combined >> 6) + ((cb_offset - 256) << (BitDepth - 8)))
      }
      noise = noiseImage[1][y][x]
      noise = Round2(scale_lut(1, merged) * noise, ScalingShift)
      OutU[y][x] = Clip3(minValue, maxChroma, cb_orig + noise)
    }
  }
}
```

In Pseudocode 3, h is the frame height in pixels, w is the frame width, cb_orig refers to the decoded/reconstructed video frame pixel (e.g., chroma $C_B$ pixels from the reconstructed pixels 655), OutY is the luma component, OutU is the chroma $C_B$ component, and OutV is the chroma $C_R$ component. Pseudocode 3 iterates through each pixel the frame based on an interval associated with the picture format, which is identified by subX and subY, to generate a chroma film grain noise (e.g., OutU) for a $C_B$ chroma component. In the case of a 4:2:0 subsampling picture format, which is explained in detail with reference to FIGS. 7A, 7B, and 7C, subX and subY are equal to 1.

The chroma noise generator 680, when executing Pseudocode 3, iterates through each pixel in a video frame (e.g., a video frame from the reconstructed pixels 655) and determines a chroma merged value (merged) based on whether chroma scaling from luma is enabled, which is a parameter in the FG parameters. If the chroma scaling from luma is enabled, the chroma noise generator 680 generates the chroma film gain noise using a representative luma value (e.g., the average luma, such as averageLuma) without any chroma components. The resulting chroma film grain is large and consumes significant memory and processing time because the luma components are exponentially larger.

If chroma scaling from luma is disabled and the number of $C_B$ points is greater than zero (e.g., there is a $C_B$ chroma component), the chroma noise generator 680 generates a combined value of $C_B$ components and the representative luma value (e.g., the average luma), and a merged components (merged) is then generated. The chroma film grain noise pixel is then generated based on various operations illustrated in Pseudocode 3. In particular, Pseudocode 3 identifies operations for the CB component, but similar pseudocode can be used by changing various parameters, such as cr_orig and OutV, to generate the chroma film grain noise (e.g. OutV) for a $C_R$ chroma component.

As illustrated in FIG. 6, the chroma noise generator 608 can generate the chroma film grain noise pixels based on an average luma 682, scaling using a lookup table (scale_lut) 682, and various blending operations 686.

Figure 10A:
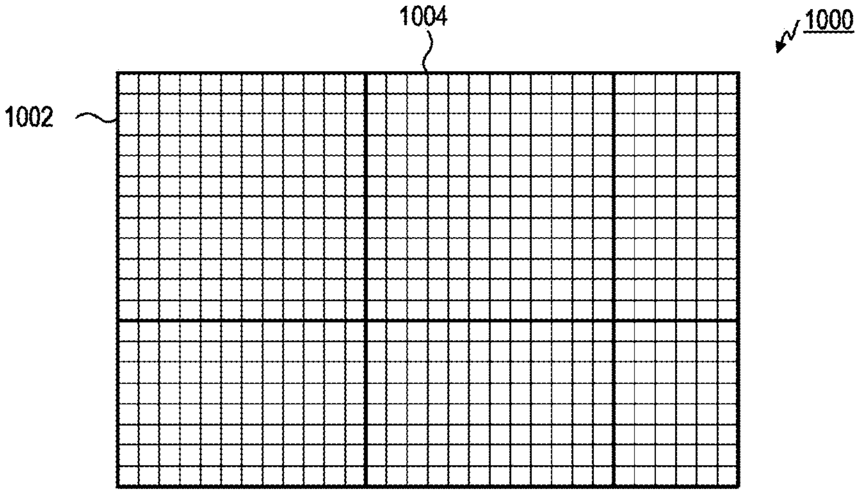
FIG. 10A illustrates an example of luma pixels of a video frame that is divided into tiles, in accordance with some examples.
Figure 10B:
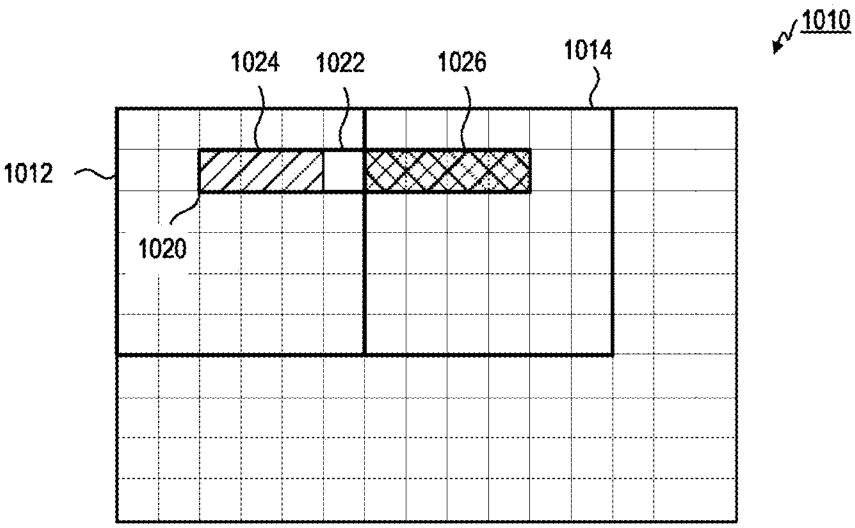
FIG. 10B illustrates an example of chroma pixels of a video frame that is divided into corresponding subtiles, in accordance with some examples.

The decoder system 600 is configured to store the luma pixels from the reconstructed pixels 655 to an average luma for the chroma film grain noise pixels. The luma pixels are stored in the memory of a local control unit (LCU), such as a core of a processor, so that the LCU can generate the chroma film grain pixels. However, the video frame can be large and can be separated into tiles that are individually processed (e.g., as illustrated in FIG. 10A and FIG. 10B). In addition, the chroma pixels (e.g., the $C_B$ and $C_R$ pixels) from the reconstructed pixels 655 may be subsampled to compress the video to improve transmission, storage, and so forth. For example, the chroma pixels may be subsampled in 4:2:0 format, and may have a different number of pixels and then luma pixels. The different number of pixels in the chroma component and the luma component can be misaligned.

For example, at a tile boundary of a video frame, which is further illustrated in FIGS. 10A and 10B, the LCU that is processing a tile cannot store the tile height of misaligned luma pixels because the storage capacity of the LCU is less than the luma pixels. For example, a tile with the coding unit of size 128 with a horizontal upscale factor of 2 is 256×128 with an 8 bit-depth consumes 32 KB of memory. In addition, there may be a misalignment of up to 20 luma pixels, and storing 20 luma pixels of each vertical tile boundary and may consume 80 KB of memory (e.g., 4096 pixels×20 pixels×1B/1024) for a 4K video frame having an 8 bit-depth. The LCU may not be capable of storing 80 KB of content, for example, in a local cache of the LCU. Accordingly, the decoder system 600 writes the luma pixels at the left edge of the tile boundary to the memory 650 and the decoder system 600 reads back the luma pixels at the right edge of the tile boundary when processing an adjacent tile.

In some examples, the memory bandwidth for the memory 650 used by the decoder system 600 to store luma pixels for the chroma film grain noise can be determined using the equation:

$$\text{Luma Memory Bandwidth} = (H * T * MisalignedPixels * 2) * B * F \text{ bits/sec} \quad \text{Equation 1}$$

In equation 1 above, H represents the height of the frame, T represents the number of tiles, B represents bit-depth, MisalignedPixels represents the quantity of pixels that are misaligned (e.g., 20 pixels), and F represents frame rate in frames per second (fps). The memory operations are scaled by two to account for write operations and corresponding read operations. According to equation 1 above, the read/write memory bandwidth of 20 misaligned luma pixels into the memory 650 of the decoder system 600 is 38.4 MBps for a 4K resolution at a 240 fps frame rate and an 8-bit bit-depth. The subsampling of the chroma components to reduce the encoded size of the video frame can increase memory bandwidth based on the alignment issues.

Figure 7A:
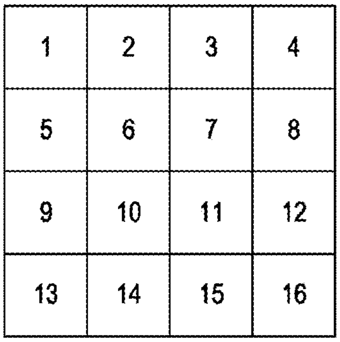
FIGS. 7A-7C illustrates an example of 4:2:0 chroma subsampling to reduce chroma components, in accordance with some examples.
Figure 7B:
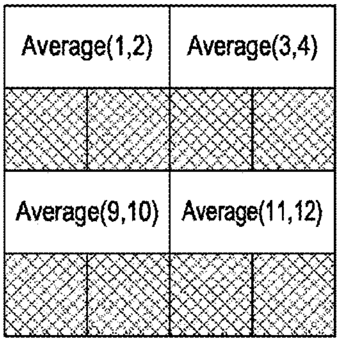
Figure 7C:
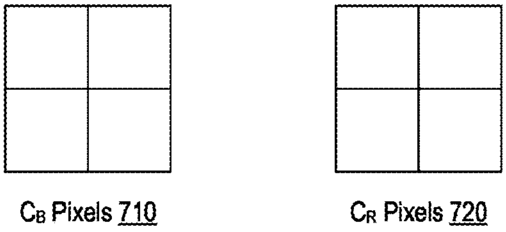

FIGS. 7A-7C illustrates an example of 4:2:0 chroma subsampling to reduce chroma components. In one example, 4:2:0 chroma subsampling, a 4×4 pixel group of each chroma component are reduced by averaging groups of pixels in a row and removing rows of pixels. FIG. 7A illustrates an example 4×4 pixel group including pixels 1 through 16. In 4:2:0 subsampling, pixels 1 through 4 and 9 through 12 are selected and pixels 5 through 8 and 13 through 16 are omitted for each chroma component, as illustrated in FIG. 7B. After selecting the pixels, groups of lateral pixels are averaged as shown in FIG. 7B to produce a 2×2 pixel group. For example, pixels 1 and 2 are averaged, pixels 3 and 4 are averaged, pixels 9 and 10 are averaged, and pixels 11 and 12 are averaged. FIG. 7C illustrates the result of 4:2:0 subsampling of the chroma components and reduces the size of the $C_B$ pixels 710 and $C_R$ pixels 720 from 16 pixels to 4 pixels.

Figure 8A:
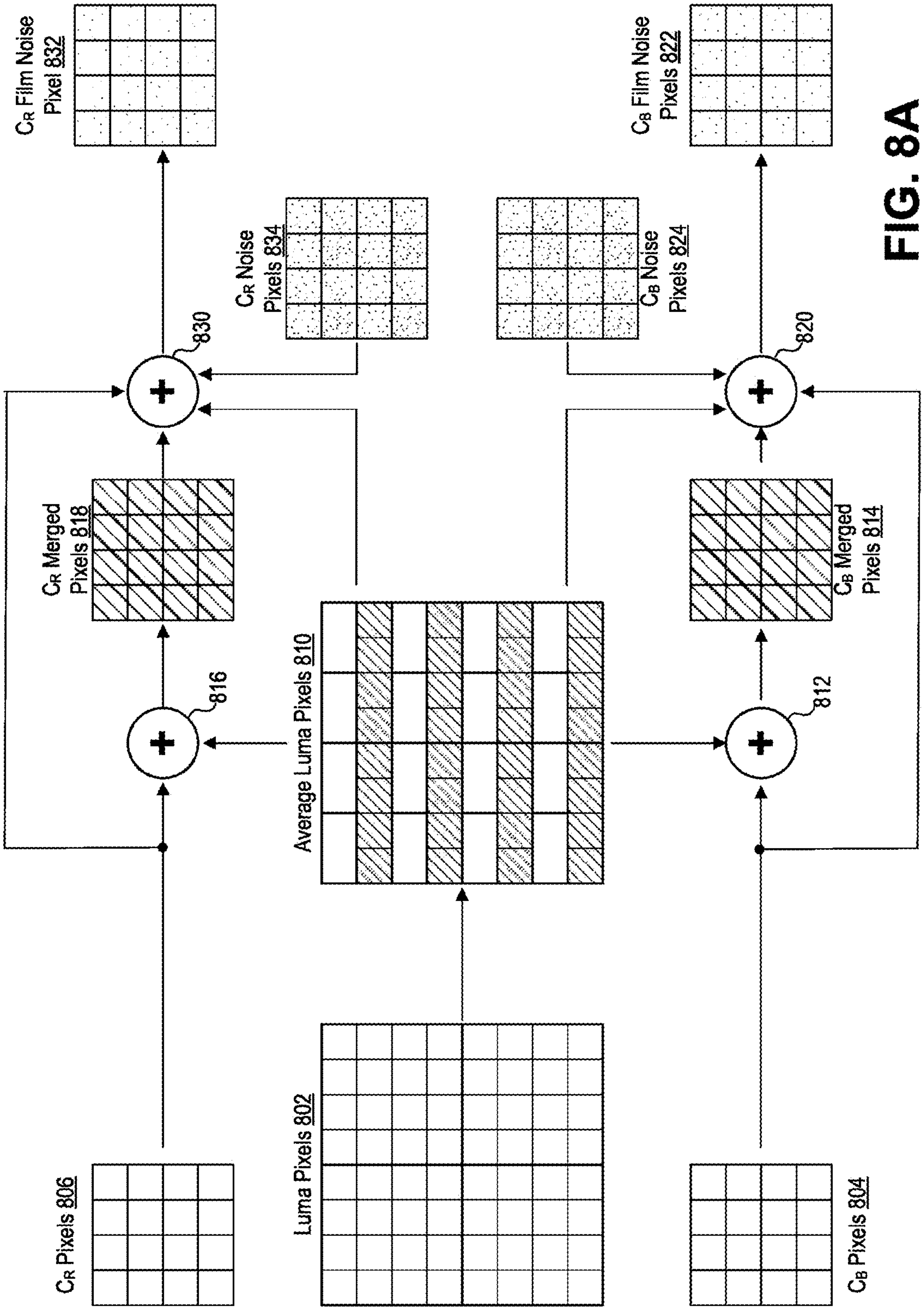
FIG. 8A is a conceptual diagram of a process by a decoding system to generate film grain noise based on chroma components of noise grain when subsampling is applied to chroma components, in accordance with some examples.

FIG. 8A is a conceptual diagram of a process by a decoding system to generate film grain noise based on chroma components of noise grain when subsampling is applied to chroma components, in accordance with some examples. In one example, a decoding system 600 may use 4:2:0 chroma subsampling and the luma components are not subsampled. As described above, the luma pixels 802 (e.g., from the reconstructed pixels 655) are not subsampled because contrast is more perceivable to the human eye, and the chroma components can be blended to generate the chroma film grain noise in the decoding system (e.g., the decoder system 600). $C_B$ pixels 804 and $C_R$ pixels 806 are subsampled to reduce the encoded video size as described above. The luma pixels 802 (e.g., luma from the reconstructed pixels 655) are subsampled to generate average luma pixels 810 that can be used to generate the chroma film grain noise pixels (e.g., the film grain pixels 670).

As illustrated in FIG. 8A, an adder 812 is configured to add the subsampled $C_B$ pixels 804 and the average luma pixels 810 to yield $C_B$ merged pixels 814, and an adder 816 is configured to add the subsampled $C_R$ pixels 806 and the average luma pixels 810 to yield $C_R$ merged pixels 818. The $C_B$ merged pixels 814 and the $C_R$ merged pixels 818 each correspond to a merged component (merged) in Pseudocode 3.

An adder 820 is configured to synthesize the various pixels into the $C_B$ film grain noise pixels 822. For example, the adder 820 adds the $C_B$ pixels 804, the average luma pixels 810, the $C_B$ merged pixels 814, and $C_B$ noise pixels 824 (e.g., from the noise image 675) to generate the $C_B$film grain noise pixels 822. An adder 830 is configured to synthesize the various pixels into the $C_R$ film grain noise pixels 832. For example, the adder 820 adds the $C_R$ pixels 806, the average luma pixels 810, the $C_R$ merged pixels 818, and $C_R$ noise pixels 834 (e.g., from the noise image 675) to generate the $C_R$ film grain noise pixels 832. As described above, the film noise pixels, including the luma noise, are added to the video frame at the end of a decoding loop, which is further illustrated in FIG. 9.

Figure 8B:
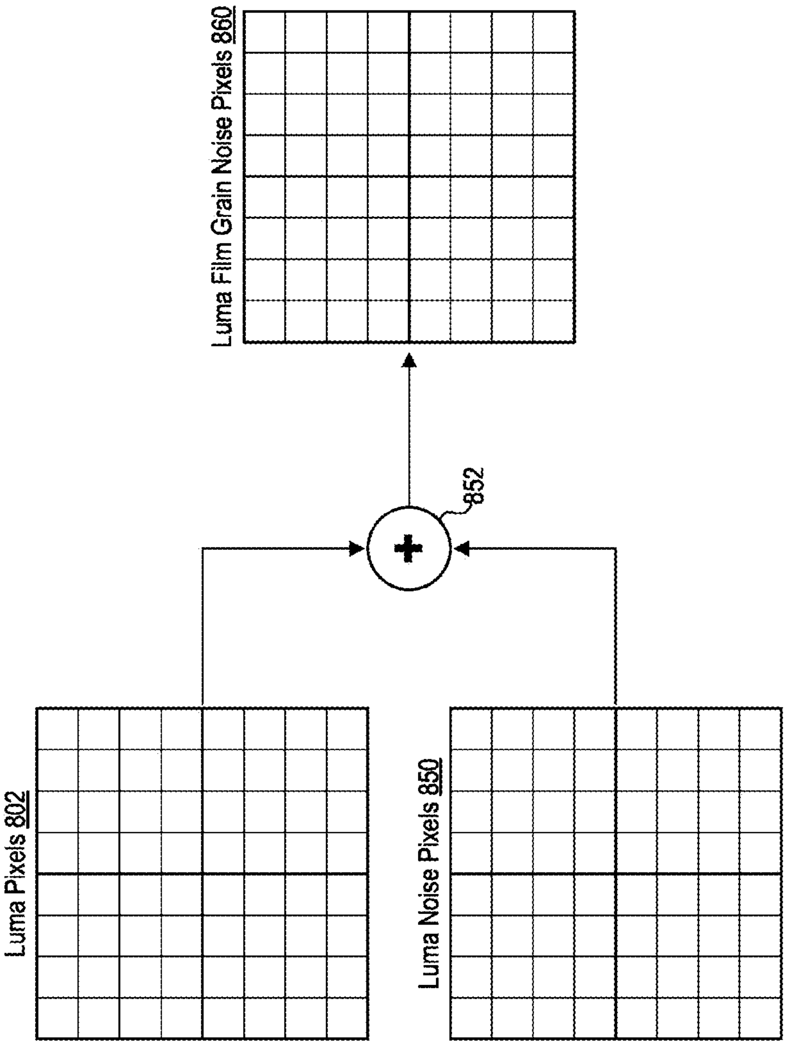
FIG. 8B is a conceptual diagram of a process by a decoding system to generate luma grain noise based on luma components of noise grain, in accordance with some examples.

FIG. 8B is a conceptual diagram of a process by a decoding system to generate luma grain noise based on luma components of noise grain. As described above, the luma components are not subsampled and therefore can be added to the film grain noise (e.g., from the noise image 675). For example, the luma pixels 802 (e.g., from the reconstructed pixels 655) can be added to luma film grain noise 850 by an adder 852 to generate the luma film grain noise pixels 860.

Figure 9:
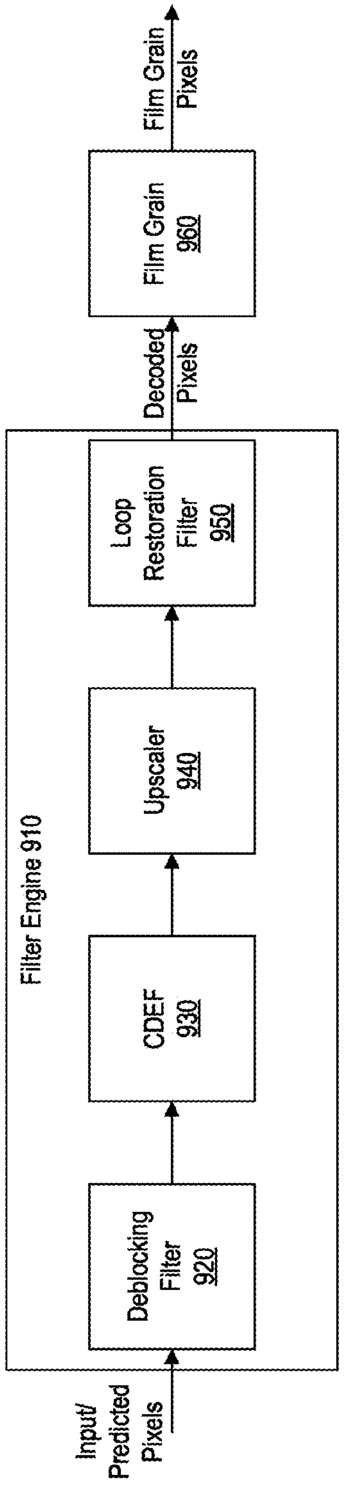
FIG. 9 illustrates an example filter at the end of a video decoder loop that applies corrective filtering and then applies film grain to video frames, in accordance with some examples.

FIG. 9 illustrates an example filter at the end of a video decoder loop that applies corrective filtering and then applies film grain (e.g., the chroma film grain noise and the luma film grain noise) to video frames. Input pixels are provided from a decoded video stream (e.g., the reconstructed pixels 655) into a filter engine 910 that filters pixels to remove artifacts that are perceivable to the human eye and improve visual fidelity. In some cases, the filter engine 910 can be normative and integral to the decoder itself (e.g., the decoder loop is required to correctly decode the input pixels). In other cases, the filter can be non-normative and filter the video after decoding.

In the illustrated example, the filter engine 910 includes a deblocking filter 920, a constrained directional enhancement filter (CDEF) 930, an upscaler 940, and a loop restoration filter 950. The deblocking filter 920 removes artifacts at the edges (or borders) of the decoded blocks of pixels. For example, a discrete cosine transformation (DCT) of an AV1 decoder can concentrate errors at edges of the decoded block. The deblocking filter 920 is configured to smooth the artifacts of the block edges.

The CDEF filter 930 is a circular directional filter that removes ringing and basis noise around sharp edges. For example, the CDEF filter 930 can identify the edges of pixels and traverse pixels based on the edges while applying a circular filter. The upscaler 940 is configured to scale the pixels, for example by a factor of up to 2, to increase the resolution. The loop restoration filter 950 is configured to restore some lost quality of the original input image. For example, the loop restoration filter 950 may include at least one convolving filter that builds a kernel to restore some lost quality of the original input image, for example by denoising and/or enhancing edges. After the filter engine, the film grain 960 is applied to the decoded video frame.

The deblocking filter 920, the horizontal scaling of the upscaler 940, and the loop restoration filter 950 in the filter engine 910 result in misalignment between the luma and chroma components due to tiling, or subdividing the video frame into tiles that are individually processed in a core of a processor. An example of tiling a video frame is illustrated in FIGS. 10A and 10B. For example, the filter engine 910 parameters are defined in 4×4 blocks of pixels and the filtering process results in shifting of the pixels because there are a different number of chroma and luma pixels. For example, a 12×12 block of luma pixels can be filtered based on the 4×4 pixel filter. However, chroma pixels, which are reduced to 6×6 pixels based on 4:2:0 subsampling, would need pixels in an adjacent tile. In this case, the chroma pixels and the luma pixels are misaligned and the various filters of the filter engine 910 are delayed because the core processing the tile does not have the pixels of the adjacent tile. For example, the average luma pixels (e.g., the average luma pixels 810) are used to generate the chroma film grain pixels as described above with reference to FIG. 8A, but may be unavailable while processing another adjacent tile.

FIG. 10A illustrates an example of luma pixels 1000 of a video frame that is divided into tiles. The example video frame is 30×20 pixels for illustrative purposes and is divided into tiles of 12×12 pixels and each processor is configured to be processed by a separate core of a processor to reduce the decoding time of the video frame. In the case of luma pixels, the video frame maintains the same size and includes a first tile 1002 and a second tile 1004 that is laterally adjacent to the first tile 1002. Because the filtering associated with a filter (e.g., the filter engine 910) is performed in a 4×4 kernel, each core can filter the 12×12 pixels in the first tile 1002 and the second tile 1004.

FIG. 10B illustrates an example of chroma pixels 1010 (e.g., $C_B$ pixels or $C_R$ pixels) of the video frame that is divided into corresponding subtiles. In this case, because the chroma components are subsampled, a tile 1012, which corresponds to the first tile 1002 in FIG. 10A, has a resolution of 6×6 pixels, and a second tile 1014, which corresponds to the second tile 1004 in FIG. 10A, also has a resolution of 6×6 pixels. A filter with a kernel of 4×4 pixels is unable to filter the first tile 1012 because the pixels in the second tile 1014 are used in the various filter operations.

A deblocking filter 1020 is depicted in FIG. 10B and is configured to determine a value of a target pixel 1022 based on laterally adjacent pixels. The deblocking filter 1020 may not be able to process a chroma components tile because there are a different number of luma and chroma pixels that are available to the deblocking filter 1020 and the deblocking filter 1020 uses the same number of pixels for filtering luma and chroma pixels. For example, based on 4:2:0 subsampling of chroma components, there is a difference in the number of pixels at a boundary of a first tile and pixels from an adjacent second tile are used to complete the filtering of the first time. The misaligned pixels in the second tile may be stored in memory after processing of the adjacent second tile and then made available for the first tile. By storing the misaligned pixels into memory, the deblocking filter 1020 can generate the chroma film grain pixels as described above.

For example, the deblocking filter 1020 is configured to use three pixels 1024 to the left of the target pixel 1022 and four pixels 1026 to the right of the target pixel 1022. As illustrated in FIG. 10B, to perform the filtering operation, the deblocking filter 1020 uses pixels in both the first tile 1012 and the second tile 1014. As the first tile 1012 and the second tile 1014 can be processed by different cores in the processor, the core may not be able to access the pixels associated with the adjacent tile. In the example illustrated in FIG. 10B, the target pixel 1022 cannot be generated based on the four pixels 1026 to the right of the target pixel 1022 because the core is processing the pixels of the tile 1012 and does not have access to the pixels of the tile 1012.

When all pixels for filtering a respective pixel are available, the filter engine 910 is configured to then filter the pixel. For example, a decoding system (e.g., the decoder system 600) can delay the filtering of pixels until pixels can be accessed from an external memory (e.g., the memory 650). The filtering of the pixels is delayed in time (or time-shifted) based on the luma pixels and chroma pixels being misaligned due to the difference between the luma pixels and chroma pixels that are processed by the filter. For example, deblocking uses four pixels of luma pixels, CDEF uses four pixels of luma pixels, and the luma shift is eight pixels. However, deblocking and CDEF of chroma pixels use four pixels because, for every two pixels of luma, there is one pixel of chroma in video having a 4:2:0 picture format.

Due to de-blocking, horizontal upscale, and loop restoration filters, the filter engine 910 creates a misalignment between the luma and chroma components. For example, the width of chroma pixels is not equal to half of the width of luma for the 4:2:0 picture format.

The upscaling of the pixels (e.g., the upscaler 940) can also cause misalignment of output pixels. The luma pixel shift after upscaling is described below in Equation 2:

$$U_{LUMA\_PIXEL} = (4 + (\text{shift of deblocking and } CDEF)) * F \quad \text{Equation 2}$$

In Equation 2, $U_{LUMA\_PIXEL}$ is the number of luma pixels that are misaligned with chroma pixels, and F is the upscaling factor (e.g., up to a factor of 1.125 to 2.0). Due to upscaling, the output pixels may not be aligned in 4-pixel increments (e.g., width in pixels % 4>0). The upscaling of the luma pixels can output an image that is in 4 pixels units, but chroma pixels may not be aligned in 4 pixels increments.

The upscaling can cause up to a 4-pixel shift between luma and chroma shift due to chroma luma mismatch. The chroma pixel shift after upscaling is described below in Equation 3:

$$U_{CHROMA\_PIXEL} = (4 + (\text{shift of deblocking and } CDEF)) * F + CL_{MISMATCH} \quad \text{Equation 3}$$

In Equation 3, $U_{CHROMA\_PIXEL}$ is the number of pixels of chroma shift due to upscaling and $CL_{MISMATCH}$ is the shift due to chroma luma mismatch. The luma pixels and the chroma pixels may be further shifted after the loop restoration (e.g., the loop restoration filter 950) based on the difference in chroma and luma pixels. The luma pixel shift and the chroma pixel shift after loop restoration are described below in Equations 4 and 5:

$$LR_{LUMA\_PIXEL} = 4 + U_{LUMA\_PIXEL} \quad \text{Equation 4}$$

$$LR_{CHROMA\_PIXEL} = 4 + U_{CHROMA\_PIXEL} \quad \text{Equation 5}$$

In Equations 4 and 5, $LR_{LUMA\_PIXEL}$ is the number of luma pixels shifted after loop restoration, and $LR_{CHROMA\_PIXEL}$ is the number of chroma pixels shifted after loop restoration. The final luma chroma misalignment for a 4:2:0 subsampled video frame is identified in Equation 6 below:

Luma Chroma Misalignment=4+(Chroma Width*2)−Luma Width Equation 6

The misalignment of pixels varies based on different combinations of filters and upscaling factors, but luma and chroma can be misalignment up to 20 pixels. Table 2 below identifies the maximum values of shift and misalignment that occur between luma pixels and chroma pixels during filtering.

TABLE 2

Luma Chroma Misalignment for 4:2:0 Subsampling

| Filter Pipeline Stage | Luma Shift | Chroma Shift | Luma Chroma Misalignment |
|---|---|---|---|
| Shift after deblocking and CDEF | 8 | 4 | 0 |
| Shift after upscaling | 24 | 20 | 16 |
| Shifter after loop restoration | 28 | 24 | 20 |

Figure 11:
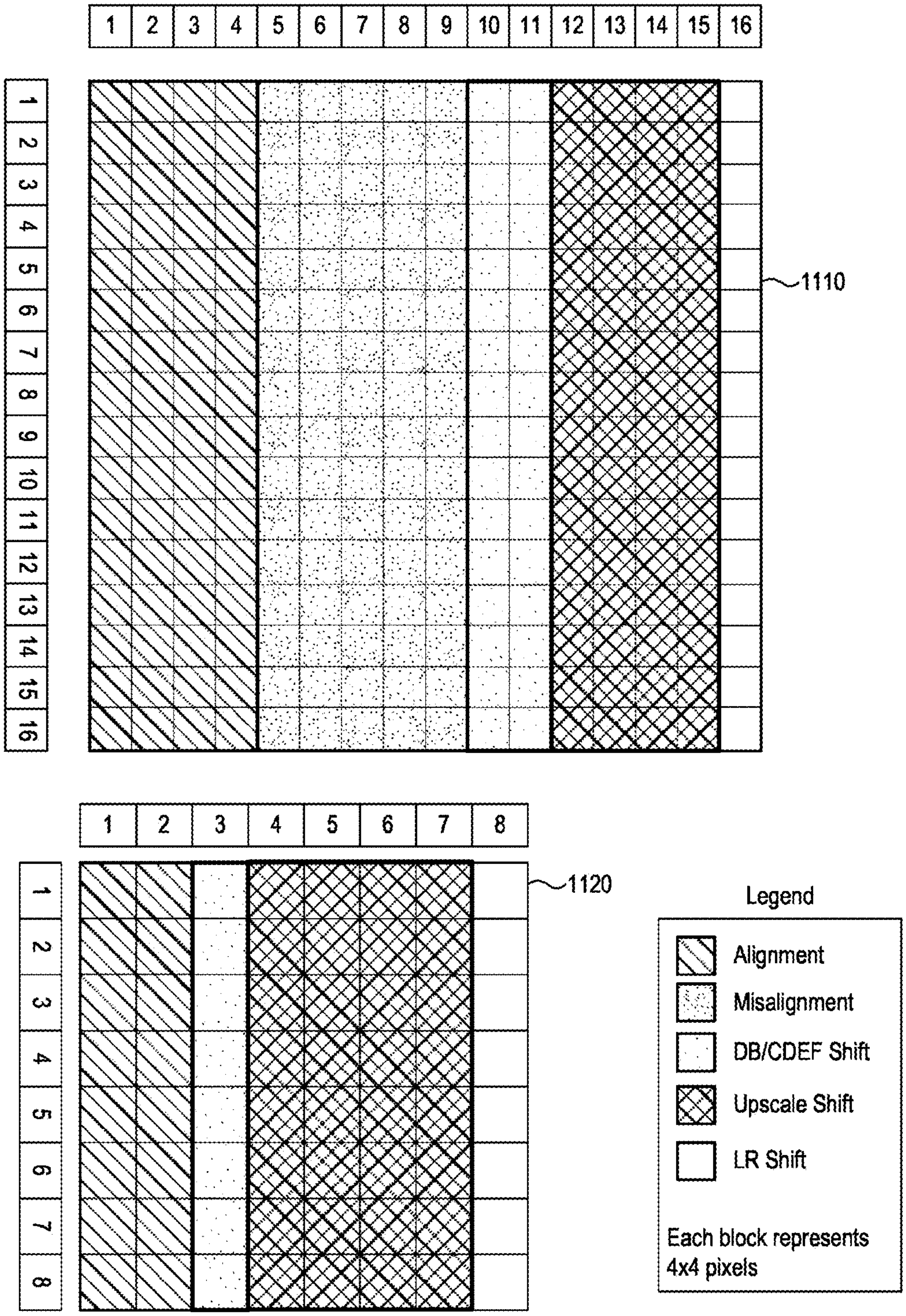
FIG. 11 is a conceptual diagram that illustrates misalignment of a luma pixels associated with a video frame and chroma pixels associated the video frame, in accordance with some examples.

FIG. 11 is a conceptual diagram that illustrates the misalignment of luma pixels 1110 associated with a video frame and chroma pixels 1120 associated with the video frame, in accordance with some examples. In the illustrated example, each block represents a 4×4 pixel block. The luma pixels 1110 have a resolution of 64×64 pixels, and the chroma pixels 1120 have a resolution of 32×32 pixels based on 4:2:0 subsampling. Columns 10 of 16 in the luma pixels 1110 are shifted to an adjacent tile (e.g., from the first tile 1002 to the second tile 1004 in FIG. 10A) and columns 3 to 8 of the chroma pixels 1120 are shifted to an adjacent tile (e.g., from the tile 1012 to the second tile 1014 in FIG. 10B). This results in the processing of columns 1 to 9 (e.g., 36 luma pixels) in the luma pixels 1110 and columns 1 and 2 (e.g., 8 chroma pixels) in the current tile. To process columns 3 to 8 (24 chroma pixels) of the chroma pixels 1120 in the adjacent tile requires columns 5 to 16 (48 luma pixels) of the luma pixels 1110, but columns 5 to 9 are processed in the current tile (e.g., the first tile 1002). The columns 5 to 9 result in a chroma-luma misalignment of 20 pixels. However, as described above, the reading and writing of the misaligned pixels in memory (e.g., the memory 650), the decoding system consumes bandwidth and power.

Figure 12:
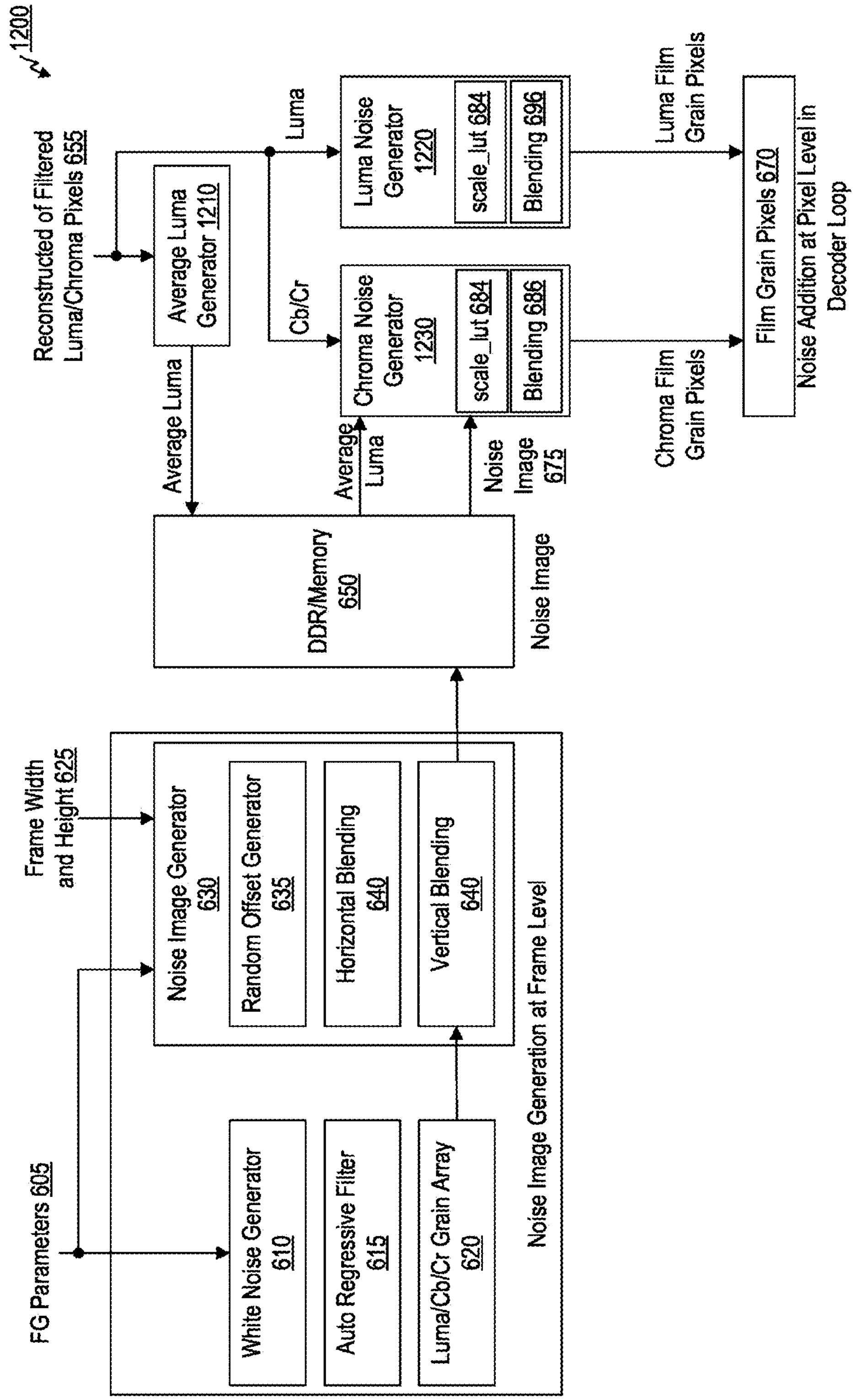
FIG. 12 is a block diagram illustrating a decoder system that generates generate and store average luma before generating the chroma noise pixels, in accordance with aspects of the disclosure

FIG. 12 is a block diagram illustrating a decoder system 1200 that generates and stores average luma before generating the chroma noise pixels, in accordance with aspects of the disclosure. The decoder system 1200 generates the grain array 620 as described above with respect to the decoder system 600, using the FG parameters 605, the white noise generator 610, and the auto-regressive filter 615. The decoder system 1200 includes a grain memory that stores the grain array 620 in its entirety.

The decoder system 1200 includes an average luma generator 1210 that is configured to first generate the average luma pixels (e.g., the average luma pixels 810) from the reconstructed pixels 655 and store the average luma values in memory (e.g., the memory 650). As described above with reference to FIGS. 8A and 8B, the average luma pixels are used to generate the chroma film noise pixels, and not the luma film noise pixels. A luma noise generator 1220 is configured to then generate luma film noise pixels based on the noise image and the luma pixels, as described above with reference to FIG. 8B. A chroma noise generator 1230 is configured to retrieve the average luma pixels from the memory 650 and generate chroma film noise pixels based on the noise image (e.g., the $C_B$ noise pixels 824 and the $C_R$ noise pixels 834), the average luma pixels, and the chroma pixels (e.g., the $C_B$ pixels 804 and the $C_R$ pixels 806), as described above with reference to FIG. 8B.

In the decoder system 600 illustrated in FIG. 6, the luma pixels are written into the memory and then the decoder system 600 determines the average luma at the time of generating the chroma film grain noise. As described above, the determination of pixels to shift in memory is not a simple solution and is complex, while also increasing read and write operations to memory. The decoder system 1200 calculates and stores the average luma pixels before generating the chroma film grain noise to reduce memory bandwidth consumption, reduce consumed memory, and decreases the decoding time of a video frame. In one aspect, the coding unit of size 128, which is 256×128 with an upscale factor of 2, stores 128×128 pixels compared to the decoder system 600 due to average luma pixels. The decoder system 1200 reduces the number of read operations and write operations and consumes half of the external memory bandwidth with an upscale factor of 2 as compared to the decoder system 600.

In some aspects, the decoder system 1200 saves a memory space of 5120 KB based on a 4K video frame with a 64 pixel tile (4096×64×(20/2)×8 bits/1024×8 bits/B) and saves local memory of 16 KB (128×128×8×4096 pixels×20 pixels×1B/1024×8 bits/B). The average luma memory bandwidth saving is described in Equation 7 below:

$$\text{Average Luma Memory Bandwidth} = \left(H * T * \frac{20}{2} * 2\right) * B * F \text{ bits/sec} \quad \text{Equation 7}$$

where H is the height of the frame, T is the number of tiles in a frame, 20/2 is the average of luma pixels, 2 is for the write operation at the left tile and read operation in the adjacent right tile, B is the bit depth, and F is the frame rate (fps). Table 3 below summarizes the DDR/external memory bandwidth savings for different Upscale factors for 4K 240 fps with 32 vertical tiles.

TABLE 3

| Memory Savings | |
|---|---|
| Upscale Factor | DDR Bandwidth Savings |
| 1.125 | 445 MBps |
| 1.25 | 510 MBps |
| 1.375 | 525 MBps |
| 1.5 | 540 MBps |
| 1.675 | 555 MBps |
| 1.75 | 570 MBps |
| 1.875 | 585 MBps |
| 2 | 600 MBps |

Figure 13:
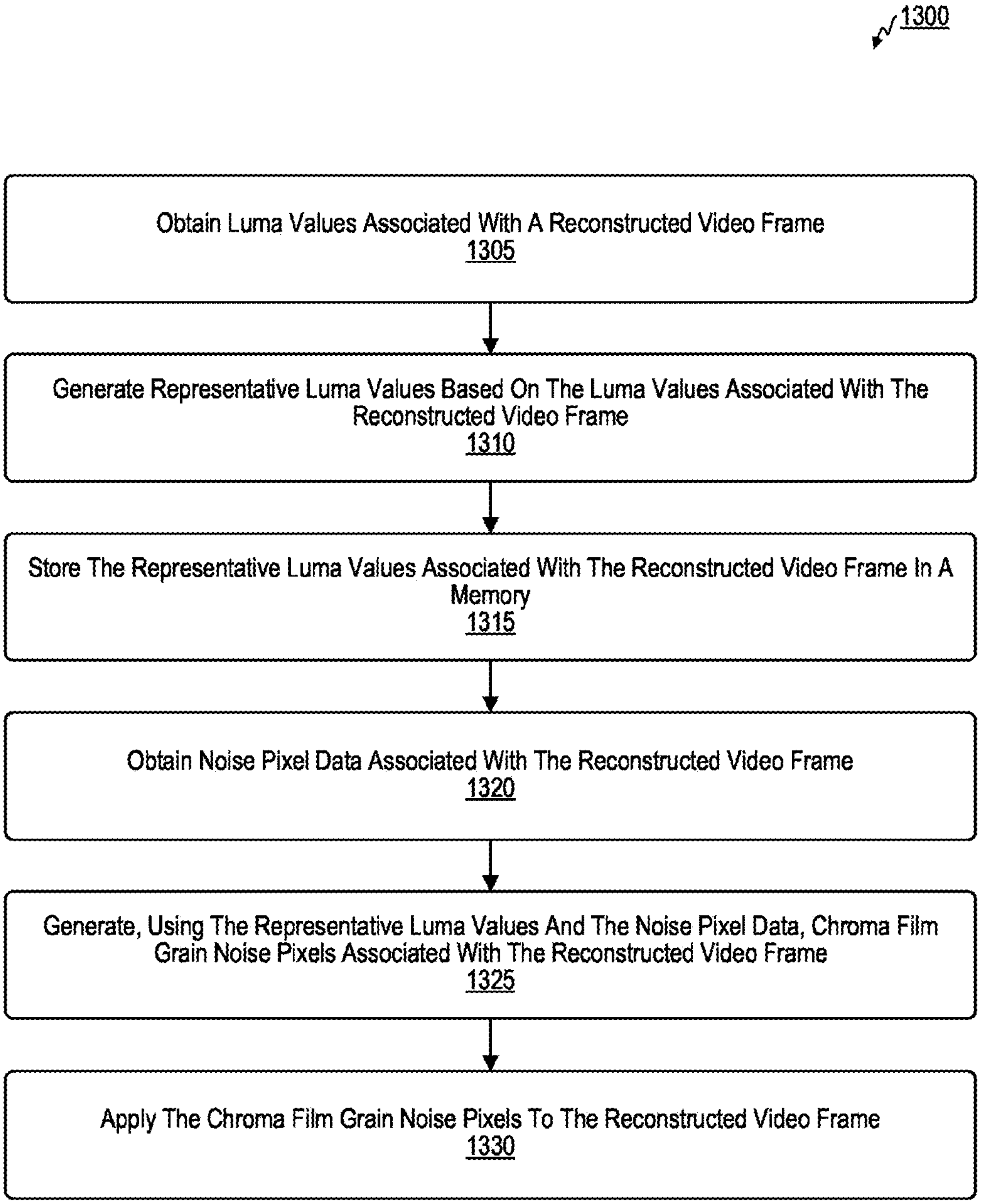
FIG. 13 is a flow diagram illustrating a codec process, in accordance with some examples.

FIG. 13 is a flow diagram illustrating a codec process 1300. The codec process 1300 may be performed by a codec system. In some examples, the codec system can include, for example, the video source 102, the encoding device 104, the encoding engine 106, the storage 108, the output 110, the communications link 120, the decoding device 112, the input 114, the decoder engine 116, the storage 118, the video destination device 122, the codec system 200, the denoiser 210, the encoding engine 220, the decoding engine 230, the analysis engine 240, the subtractor 250, the grain estimation engine 260, the grain generator 270, the adder 280, the encoder 290, the decoder 295, the decoder system 600, the decoder system 1200, the computing system 1400, the processor 1410, an apparatus, a non-transitory computer-readable medium that stores instructions for execution by one or more processors, a mobile handset, a head-mounted display (HMD), a wireless communication device, or a combination thereof.

At block 1305, the computing system obtains luma values associated with a reconstructed video frame. In one illustrative aspect, the reconstructed video frame is a first tile of the reconstructed video frame. In some cases, the video frame may be divided into distinct tiles to reduce decoding time.

At block 1310, the computing system generates representative luma values based on the luma values associated with the reconstructed video frame. In one aspect, the representative luma values are one or more average luma values associated with the reconstructed video frame. Other variations of a representative luma values include a median value, an interpolated value, etc.

At block 1315, the computing system stores the representative luma values associated with the reconstructed video frame in a memory. In one illustrative aspect, the representative luma values associated with the reconstructed video frame are stored in the memory before retrieving the noise pixel data associated with the reconstructed video frame. As described above, storing the average luma reduces memory bandwidth read and write cycles, and also conserves power.

At block 1320, the computing system obtains noise pixel data associated with the reconstructed video frame. As illustrated in Pseudocode 3, the noise pixel data includes luma pixels and chroma pixels.

In one aspect, the computing system generates luma noise film grain pixels associated with a portion of the reconstructed video frame based on the noise pixel data. The computing system generates the luma noise film grain pixels associated with the portion of the reconstructed video frame before generating the chroma film grain noise pixels.

In one illustrative aspect, the computing system identifies a block of pixels in the representative luma values associated with the reconstructed video frame. In one illustrative aspect, the block of pixels in the representative luma values are partially selected from a second tile of the reconstructed video frame that is adjacent to the first tile. An example of generating the luma film grain noise pixels is illustrated in FIG. 8B.

At block 1325, the computing system generates, using the representative luma values and the noise pixel data, chroma film grain noise pixels associated with the reconstructed video frame. An example of generating the chroma film grain noise pixels is illustrated in FIG. 8A.

In some aspects, the computing system may have multiple cores (e.g., a first core and a second core) to process the tiles. For example, a first core of the processor generates a portion of the chroma film grain noise pixels corresponding to the first tile of the reconstructed video frame and a second core of the processor generates a portion of the chroma film grain noise pixels corresponding to the second tile of the reconstructed video frame. In one aspect, the first core can generate the portion of the chroma film grain noise pixels corresponding to the first tile while the second core generates the portion of the chroma film grain noise pixels corresponding to the second tile. As described above, the at least partial processing of tiles reduces the decoding time of the video frame.

At block 1330, the computing system applies the chroma film grain noise pixels to the reconstructed video frame. In some aspect, the computing system applies the luma noise film grain pixels to the portion of the reconstructed video frame. After applying the chroma film grain noise pixels and/or the luma noise film grain pixels, the computing system may output the reconstructed video frame with the chroma film grain noise pixels and/or the luma film grain noise pixels to a display.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, a vehicle or computing device of a vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. In some examples, performance of certain operations described herein can be responsive to performance of other operations described herein.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
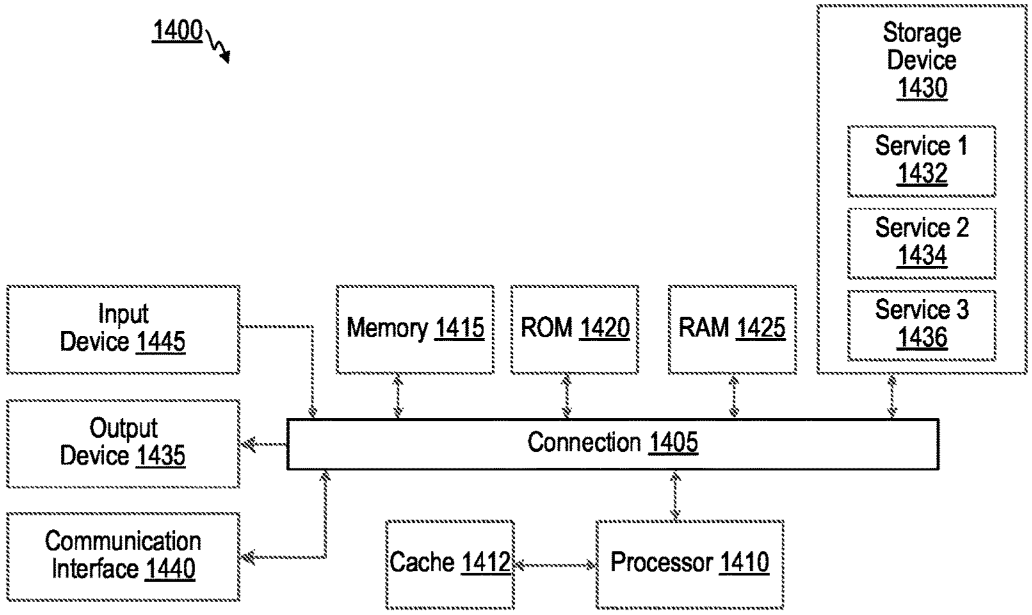
FIG. 14 is a diagram illustrating an example of a computing system for implementing certain aspects described herein.

FIG. 14 is a diagram illustrating an example of a system for implementing certain aspects of the present technology. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some aspects, computing system 1400 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1402.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some aspects, a hardware service that performs a particular function can include the software component stored in a computer-readable medium in connection with the necessary hardware components, such as processor 1410, connection 1405, output device 1435, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than (“<”) and greater than (“>”) symbols or terminology used herein can be replaced with less than or equal to (“ ”) and greater than or equal to (“ ”) symbols, respectively, without departing from the scope of this description.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” means A, B, or A and B. In another example, claim language reciting “at least one of A, B, and C” means A, B, C, or A and B, or A and C, or B and C, or A and B and C. The language “at least one of” a set and/or “one or more” of a set does not limit the set to the items listed in the set. For example, claim language reciting “at least one of A and B” can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term “processor,” as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A method for video decoding, the method comprising: obtaining luma values associated with a reconstructed video frame; generating representative luma values based on the luma values associated with the reconstructed video frame; storing the representative luma values associated with the reconstructed video frame in a memory; obtaining noise pixel data associated with the reconstructed video frame; generating, using the representative luma values and the noise pixel data, chroma film grain noise pixels associated with the reconstructed video frame; and applying the chroma film grain noise pixels to the reconstructed video frame.

Aspect 2. The method of Aspect 1, wherein the representative luma values are one or more average luma values associated with the reconstructed video frame.

Aspect 3. The method of any one of Aspects 1 to 2, further comprising: identifying a block of pixels in the representative luma values associated with the reconstructed video frame.

Aspect 4. The method of Aspect 3, wherein the reconstructed video frame is a first tile of the reconstructed video frame, wherein the block of pixels in the representative luma values are partially selected from a second tile of the reconstructed video frame that is adjacent to the first tile.

Aspect 5. The method of Aspect 4, further comprising: generating, using a first core of a processor, a portion of the chroma film grain noise pixels corresponding to the first tile of the reconstructed video frame; and generating, using a second core of the processor, a portion of the chroma film grain noise pixels corresponding to the second tile of the reconstructed video frame.

Aspect 6. The method of Aspect 5, further comprising: generating, using the first core, the portion of the chroma film grain noise pixels corresponding to the first tile while generating, using the second core, the portion of the chroma film grain noise pixels corresponding to the second tile.

Aspect 7. The method of any one of Aspects 1 to 6, wherein the representative luma values associated with the reconstructed video frame are stored in the memory before retrieving the noise pixel data associated with the reconstructed video frame.

Aspect 8. The method of Aspect 7, further comprising: generating luma noise film grain pixels associated with a portion of the reconstructed video frame based on the noise pixel data.

Aspect 9. The method of Aspect 8, wherein the luma noise film grain pixels associated with the portion of the reconstructed video frame are generated before the chroma film grain noise pixels.

Aspect 10. The method of Aspect 9, further comprising: applying the luma noise film grain pixels to the portion of the reconstructed video frame.

Aspect 11. An apparatus for decoding video, the apparatus comprising at least one memory and at least one processor coupled to the at least one memory and configured to: obtain luma values associated with a reconstructed video frame; generate representative luma values based on the luma values associated with the reconstructed video frame; store the representative luma values associated with the reconstructed video frame in a memory; obtain noise pixel data associated with the reconstructed video frame; generate, using the representative luma values and the noise pixel data, chroma film grain noise pixels associated with the reconstructed video frame; and apply the chroma film grain noise pixels to the reconstructed video frame.

Aspect 12. The apparatus of Aspect 11, wherein the representative luma values are one or more average luma values associated with the reconstructed video frame.

Aspect 13. The apparatus of any of Aspects 11 to 12, wherein the at least one processor is configured to: identify a block of pixels in the representative luma values associated with the reconstructed video frame.

Aspect 14. The apparatus of Aspect 13, wherein the reconstructed video frame is a first tile of the reconstructed video frame, and wherein the block of pixels in the representative luma values are partially selected from a second tile of the reconstructed video frame that is adjacent to the first tile.

Aspect 15. The apparatus of Aspect 14, wherein the at least one processor is configured to: generate, using a first core of a processor, a portion of the chroma film grain noise pixels corresponding to the first tile of the reconstructed video frame; and generate, using a second core of the processor, a portion of the chroma film grain noise pixels corresponding to the second tile of the reconstructed video frame.

Aspect 16. The apparatus of Aspect 15, wherein the at least one processor is configured to: generate, using the first core, the portion of the chroma film grain noise pixels corresponding to the first tile while generating, using the second core, the portion of the chroma film grain noise pixels corresponding to the second tile.

Aspect 17. The apparatus of any of Aspects 11 to 16, wherein the representative luma values associated with the reconstructed video frame are stored in the memory before retrieving the noise pixel data associated with the reconstructed video frame.

Aspect 18. The apparatus of Aspect 17, wherein the at least one processor is configured to: generate luma noise film grain pixels associated with a portion of the reconstructed video frame based on the noise pixel data.

Aspect 19. The apparatus of Aspect 18, wherein the luma noise film grain pixels associated with the portion of the reconstructed video frame are generated before the chroma film grain noise pixels.

Aspect 20. The apparatus of Aspect 19, wherein the at least one processor is configured to: apply the luma noise film grain pixels to the portion of the reconstructed video frame.

Aspect 21. A non-transitory computer-readable medium comprising instructions which, when executed by one or more processors, cause the one or more processors to perform operations according to any of Aspects 1 to 10.

Aspect 22. An apparatus comprising means for performing operations according to any of Aspects 1 to 10.

What is claimed is:

1. A method for video decoding, the method comprising:

obtaining luma values associated with a reconstructed video frame;

generating representative luma values associated with the reconstructed video frame based on the luma values;

storing the representative luma values in a memory, wherein the representative luma values are stored in the memory before obtaining noise pixel data associated with the reconstructed video frame;

obtaining the noise pixel data;

generating, using the representative luma values and the noise pixel data, chroma film grain noise pixels associated with the reconstructed video frame; and applying the chroma film grain noise pixels to the reconstructed video frame.

2. The method of claim 1, wherein the representative luma values are one or more average luma values associated with the reconstructed video frame.

3. The method of claim 1, further comprising:

identifying a block of pixels in the representative luma values.

4. The method of claim 3, wherein the reconstructed video frame is a first tile of the reconstructed video frame, wherein the block of pixels in the representative luma values is partially selected from a second tile of the reconstructed video frame that is adjacent to the first tile.

5. The method of claim 4, further comprising:

generating, using a first core of a processor, a portion of the chroma film grain noise pixels corresponding to the first tile of the reconstructed video frame; and generating, using a second core of the processor, a portion of the chroma film grain noise pixels corresponding to the second tile of the reconstructed video frame.

6. The method of claim 5, further comprising:

generating, using the first core, the portion of the chroma film grain noise pixels corresponding to the first tile while generating, using the second core, the portion of the chroma film grain noise pixels corresponding to the second tile.

7. The method of claim 1, further comprising:

generating luma noise film grain pixels associated with a portion of the reconstructed video frame based on the noise pixel data.

8. The method of claim 7, wherein the luma noise film grain pixels associated with the portion of the reconstructed video frame are generated before the chroma film grain noise pixels.

9. The method of claim 8, further comprising:

applying the luma noise film grain pixels to the portion of the reconstructed video frame.

10. An apparatus for decoding video, comprising:

at least one memory; and at least one processor coupled to at least one memory and configured to:

obtain luma values associated with a reconstructed video frame;

generate representative luma values associated with the reconstructed video frame based on the luma values;

store the representative luma values in a memory, wherein the representative luma values are stored in the memory before obtaining noise pixel data associated with the reconstructed video frame;

obtain the noise pixel data;

generate, using the representative luma values and the noise pixel data, chroma film grain noise pixels associated with the reconstructed video frame; and apply the chroma film grain noise pixels to the reconstructed video frame.

11. The apparatus of claim 10, wherein the representative luma values are one or more average luma values associated with the reconstructed video frame.

12. The apparatus of claim 10, wherein the at least one processor is configured to: identify a block of pixels in the representative luma value.

13. The apparatus of claim 12, wherein the reconstructed video frame is a first tile of the reconstructed video frame, wherein the block of pixels in the representative luma values is partially selected from a second tile of the reconstructed video frame that is adjacent to the first tile.

14. The apparatus of claim 13, wherein the at least one processor is configured to:

generate, using a first core of a processor, a portion of the chroma film grain noise pixels corresponding to the first tile of the reconstructed video frame; and generate, using a second core of the processor, a portion of the chroma film grain noise pixels corresponding to the second tile of the reconstructed video frame.

15. The apparatus of claim 14, wherein the at least one processor is configured to: generate, using the first core, the portion of the chroma film grain noise pixels corresponding to the first tile and concurrently generate, using the second core, the portion of the chroma film grain noise pixels corresponding to the second tile.

16. The apparatus of claim 10, wherein the at least one processor is configured to: generate luma noise film grain pixels associated with a portion of the reconstructed video frame based on the noise pixel data.

17. The apparatus of claim 16, wherein:

the luma noise film grain pixels associated with the portion of the reconstructed video frame are generated before the chroma film grain noise pixels; and the at least one processor is configured to apply the luma noise film grain pixels to the portion of the reconstructed video frame.

18. A non-transitory computer-readable medium comprising instructions which, when executed by one or more processors, cause the one or more processors to:

obtain luma values associated with a reconstructed video frame;

generate representative luma values associated with the reconstructed video frame based on the luma values;

store the representative luma values in a memory, wherein the representative luma values are stored in the memory before obtaining noise pixel data associated with the reconstructed video frame;

obtain the noise pixel data;

generate, using the representative luma values and the noise pixel data, chroma film grain noise pixels associated with the reconstructed video frame; and apply the chroma film grain noise pixels to the reconstructed video frame.

* * * * *